US010419288B2

(12) United States Patent
Tofighbakhsh et al.

(10) Patent No.: US 10,419,288 B2
(45) Date of Patent: *Sep. 17, 2019

(54) NETWORK OPERATING SYSTEM CLIENT ARCHITECTURE FOR MOBILE USER EQUIPMENT

(71) Applicant: AT&T INTELLECTUAL PROPERTY I, L.P., Atlanta, GA (US)

(72) Inventors: Mostafa Tofighbakhsh, Cupertino, CA (US); David R. Wolter, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,838

(22) Filed: Mar. 20, 2018

(65) Prior Publication Data

US 2018/0219734 A1 Aug. 2, 2018

Related U.S. Application Data

(63) Continuation of application No. 15/423,547, filed on Feb. 2, 2017, now Pat. No. 9,948,511, which is a
(Continued)

(51) Int. Cl.
*H04W 24/02* (2009.01)
*H04L 12/24* (2006.01)
(Continued)

(52) U.S. Cl.
CPC ...... *H04L 41/0816* (2013.01); *H04L 47/2475* (2013.01); *H04W 4/50* (2018.02);
(Continued)

(58) Field of Classification Search
CPC ....... H04W 24/02; H04W 84/18; H04W 4/00; H04W 28/02; H04W 76/04; H04W 36/14; H04W 88/18; H04W 52/0216
See application file for complete search history.

(56) References Cited

U.S. PATENT DOCUMENTS 6,484,196 B1 11/2002 Maurille
7,551,939 B2 6/2009 Acampora
(Continued)

OTHER PUBLICATIONS

Niazi et al., "Agent-Based Tools for Modeling and Simulation of Self-Organization in Peer-to-Peer, Ad Hoc, and Other Complex Networks", IEEE Communications Magazine, Mar. 2009, 8 pages.
(Continued)

*Primary Examiner* — Vinncelas Louis
(74) *Attorney, Agent, or Firm* — Amin, Turocy & Watson, LLP

(57) ABSTRACT

A network operating system agent can operate to facilitate communications to a network device and a managing server of self-organizing network devices to exchange contexts between an application managed by a user equipment device and the network device. Relationships between self-organizing devices and applications of a user equipment device can be extended so that the network devices are context aware of the application settings. In response to detecting the user equipment device communicating via the network devices, a set of user equipment device parameters and a set of application settings of the application can be communicated to the network devices. The application settings can be modified according to the a set of radio network performance settings of the self-organizing network devices with the user equipment device based on the set of user equipment device parameters and the set of application settings of the application.

20 Claims, 11 Drawing Sheets

Related U.S. Application Data continuation of application No. 14/049,991, filed on Oct. 9, 2013, now Pat. No. 9,565,576.

(51) Int. Cl.

| | | |
|---|---|---|
| *H04W 4/50* | (2018.01) | |
| *H04W 28/02* | (2009.01) | |
| *H04W 48/18* | (2009.01) | |
| *H04L 12/859* | (2013.01) | |
| *H04W 72/12* | (2009.01) | |
| *H04W 84/18* | (2009.01) | |
| *H04W 36/22* | (2009.01) | |
| *H04W 36/26* | (2009.01) | |
| *H04W 28/08* | (2009.01) | |

(52) U.S. Cl.
CPC .......... *H04W 24/02* (2013.01); *H04W 28/02* (2013.01); *H04W 48/18* (2013.01); *H04W 72/1289* (2013.01); *H04W 28/08* (2013.01); *H04W 36/22* (2013.01); *H04W 36/26* (2013.01); *H04W 84/18* (2013.01)

(56) References Cited

U.S. PATENT DOCUMENTS

| | | | |
|---|---|---|---|
| 9,001,682 | B2 | 4/2015 | Kovvali et al. |
| 2003/0105864 | A1 | 6/2003 | Mulligan et al. |
| 2010/0299419 | A1 | 11/2010 | Ramankutty et al. |
| 2010/0311421 | A1 | 12/2010 | Mach et al. |
| 2011/0053601 | A1 | 3/2011 | Frederiksen et al. |
| 2011/0167138 | A1 | 7/2011 | Fieau et al. |
| 2012/0034910 | A1 | 2/2012 | Fang et al. |
| 2012/0036051 | A1 | 2/2012 | Sachson et al. |
| 2012/0071168 | A1 | 3/2012 | Tomici et al. |
| 2012/0278464 | A1 | 11/2012 | Lehane et al. |
| 2012/0307697 | A1 | 12/2012 | Mukhopadhyay et al. |
| 2013/0143542 | A1 | 6/2013 | Kovvali et al. |
| 2014/0040504 | A1 | 2/2014 | Gupta |
| 2015/0189557 | A1 | 7/2015 | Touati et al. |

OTHER PUBLICATIONS

Olascuaga-Cabrera et al., "Self-organization of Mobile Devices Networks", IEEE International Conference on System of Systems Engineering, May 30, 2009-Jun. 3, 2009, 6 pages.

Drabu, Yasir. "A Survey of Design Issues in Self Organizing Wireless Networks", published online at [http://medianet.kent.edu/surveys/IAD01F-adhocnetwork/index.html], Nov. 2001, retrieved on Jan. 9, 2014, 7 pages.

Office Action dated Jul. 29, 2015 for U.S. Appl. No. 14/049,991, 54 pages.

Office Action dated Jun. 15, 2016 for U.S. Appl. No. 14/049,991, 61 pages.

Office Action dated Jan. 29, 2016 for U.S. Appl. No. 14/049,991, 49 pages.

Office Action dated Apr. 5, 2017 for U.S. Appl. No. 15/423,547, 51 pages.

Notice of Allowance for U.S. Appl. No. 14/049,991, 80 pages.

Supplemental Notice of Allowance for U.S. Appl. No. 14/049,991, 12 pages.

NETWORK OPERATING SYSTEM CLIENT ARCHITECTURE FOR MOBILE USER EQUIPMENT

CROSS-REFERENCE TO RELATED APPLICATIONS

The subject application is a continuation of, and claims priority to each of, U.S. patent application Ser. No. 15/423,547 (now U.S. Pat. No. 9,948,511), entitled "NETWORK OPERATING SYSTEM CLIENT ARCHITECTURE FOR MOBILE USER EQUIPMENT," and filed on Feb. 2, 2017, which is a continuation of U.S. patent application Ser. No. 14/049,991 (now U.S. Pat. No. 9,565,576), entitled "NETWORK OPERATING SYSTEM CLIENT ARCHITECTURE FOR MOBILE USER EQUIPMENT," and filed on Oct. 9, 2013. The entirety of the above noted application is incorporated herein by reference.

TECHNICAL FIELD

The subject disclosure relates to wireless communications and, in particular, to network operating system client architecture for mobile user equipment.

BACKGROUND

The use of mobile devices and the resulting mobile traffic continues growing at a very fast pace and the trend shows no signs of stopping. To meet the mobile traffic growth and improve the end user experience, mobile service providers are actively looking for mechanisms to improve network efficiency, system capacity, and end user experience by cost effectively leveraging all radio network technologies, including cellular and Wi-Fi technologies. The routing of network traffic to a Wi-Fi radio and to a cellular radio, for example, can affect the user experience. For example, if the network traffic is routed to a network that is not appropriate for that network traffic, it can result in loss of the communication (e.g., dropped calls), poor services, and other negative impacts to the user experience.

To ensure customer satisfaction, wireless service providers aim to deliver a high quality service at any location, to facilitate reliable and efficient mobile communications. Consumers can access a growing number of networks using a mobile device. These networks include, for example, 3G networks, 4G networks, long-term evolution networks and Wi-Fi networks. These networks allow consumers to communicate voice, text, multimedia, and other data to and from other network entities, such as servers and other mobile devices.

BRIEF DESCRIPTION OF THE DRAWINGS

Various non-limiting embodiments are further described with reference to the accompanying drawings in which.

DETAILED DESCRIPTION

Figure 1:
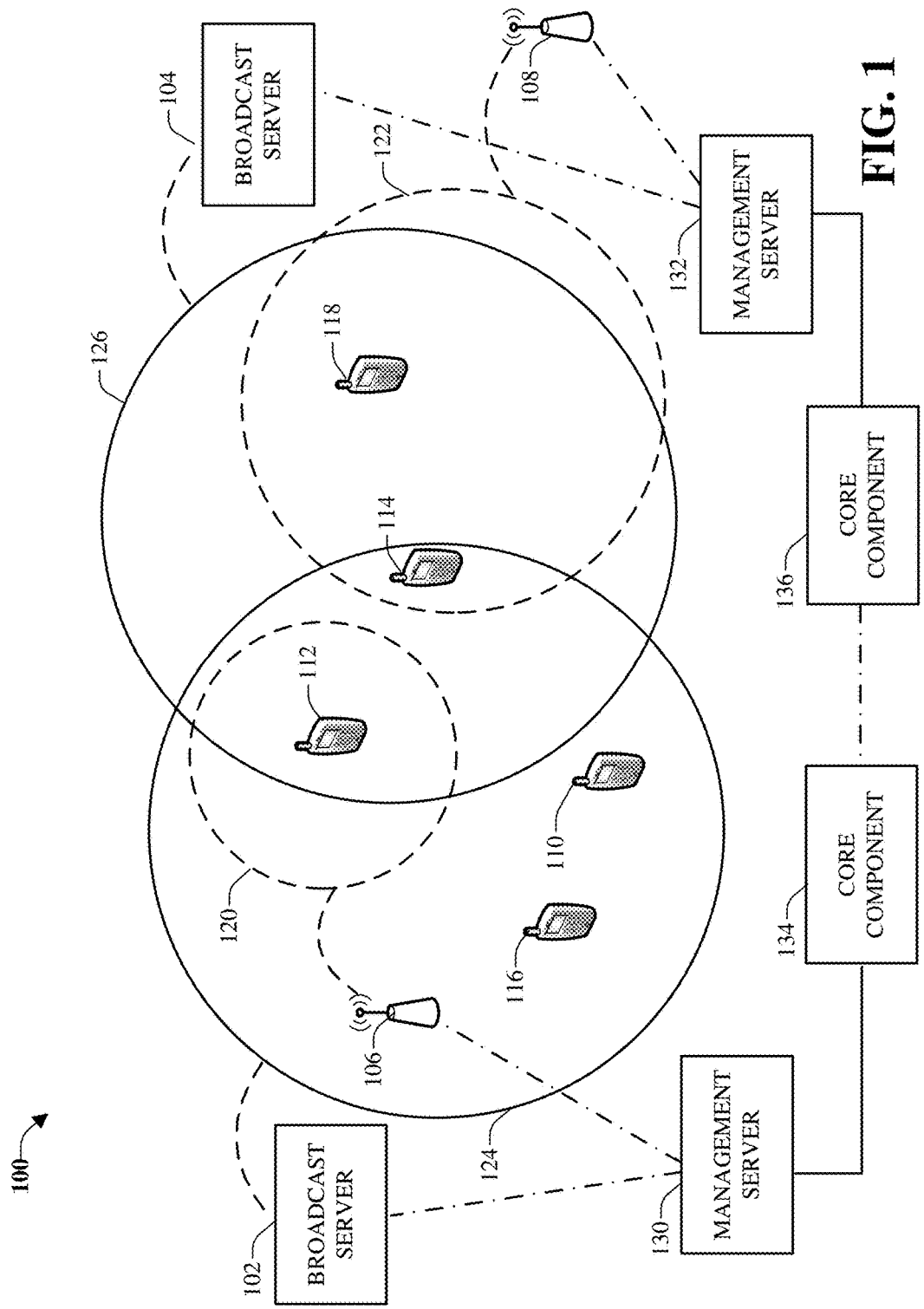
FIG. 1 illustrates an example, non-limiting wireless communications environment that can be utilized with the disclosed aspects.

Aspects of the subject disclosure will now be described more fully hereinafter with reference to the accompanying drawings that illustrate different example embodiments. In the following description, for purposes of explanation, numerous specific details are set forth in order to provide a thorough understanding of the various embodiments. However, the subject disclosure can embody many different forms and should not be construed as limited to the example embodiments set forth herein.

The management of current relationships between the applications managed by user equipment (UE) devices (e.g., mobile devices) and the different networks that the UEs travel through is not complete. For example, mobile applications are network blind, and networks are application blind, such that the mobile application settings are not controlled or modified by the networking operations and vice versa. A need therefore exits to apply an innovative Self Organizing Network (SON) approach between the applications managed by UEs and the self-organizing network devices through a Network Operating System Agent (NOSA), or otherwise indicated as a NOSA kernel, a NOSA manger and the like, which can operate to establish and manage relationships between the application and network behaviors.

In one embodiment, the application and network relationships can extend beyond just the radio access network and Quality of Service (QOS), and can comprise mechanisms for self-organized approaches to diversify data delivery, self-organizing control considerations based on UE parameters. For example, current general purpose operating systems do not operate to couple network level self-organizing and performance management functions between the self-organizing network devices and the UE applications functionally managed by the UE, which can also operate together with an external storage (e.g., a cloud storage) storing the application. The NOSA, however, operates to provide and separate management of network bandwidth, load balancing, self-organizing functions, traffic monitoring probes, traffic time shifting, offloading, preloading functions, and network policy to the applications and UEs managing the applications from the networks.

The relationships between the applications and managing UEs with the network devices can include any interactions for operating over a network managed by the network devices, such as a Wi-Fi network device, a macro cell network device, a micro cell network device, a Femto cell network device, etc., and other corresponding networks of network devices. The relationships managed by the NOSA can be operational functions between the self-organizing network devices and the applications of the UE, which selectively operate based on UE parameters. For example, UE parameters can comprise UE sensed data, or data detected with respect to the UE functions. For example, some UE parameters can comprise accelerometer data, battery power data, speed data, directional data, and network observed signaling data, load data, and congestion data, or any other UE sensed data.

In another embodiment, the self-organizing network devices can include an innovative integrated storage blade that is communicatively coupled to a Radio Access Network (RAN) device and a mobile packet core as part of SON devices that can function to perform real time traffic profiling, analytics packet reprioritization, data time shifting and network store and forward functions. The self-organizing network devices can provide and separate management of network bandwidth, load balancing, self-organizing functions, traffic monitoring probes, traffic time shifting, offloading, preloading, and network policy to the applications and users.

To meet mobile traffic growth, one or more of the disclosed aspects provides a network architecture that enables selection of the best available radio technology (from all available radio technologies, including cellular and Wi-Fi technologies) for user traffic delivery according to the needs of applications managed on UEs. The network selection can be a function of radio network conditions (radio network performance settings), user subscription profile, application settings, device mobility state (e.g., speed and pattern), application settings on a UE device, and so on, to improve network efficiency, provide the requested data delivery conditions for the application's demands. The network devices can provide data delivery conditions or options to the network devices via the relationships managed by the NOSA with the applications and according to various triggers communicated by the applications because of such relationships. Further, the selection can provide a consistent user experience across multiple types of user equipment, operating system, and original equipment manufacturer (OEM) manufactures and platforms. One or more of the disclosed aspects can also provide Application Program Interfaces (APIs) that allow for the development of Access Network Discovery and Selection Function (ANDSF) carrier clients that can operate in conjunction with the self-organizing devices through the NOSA.

In another embodiment, the UE device (e.g., mobile device) and/or the application(s) that the UE manages can make determinations related to which radio network to use, what the QOS will be, when to use that radio network, and under what conditions or triggers to route or have routed the user traffic based on one or more attributes or conditions. Decisions can be based on one or more of the following: an ANDSF policy (e.g., 3GPP ANDSF capabilities, 4GPP capabilities, Wi-Fi network capabilities, user equipment intelligence, and the other network capabilities); cellular network congestion condition and parameters; Wi-Fi network congestion condition; and/or mobile device information, including battery usage, mobile device relative movement with respect to a Wi-Fi access point (e.g., speed, vibration, patterns), mobile device relative movement with respect to a cellular access point, other UE parameters discussed herein, and so on. In another embodiment, a UE can interact with a kernel that operates as the NOSA that resides on the UE, or on as an external device operationally coupled to the UE, which can instruct network devices on routing the user traffic to the selected radio network device (e.g., Wi-Fi, Femto cell, Macro cell, Micro cell, etc.) or for certain radio network performance parameters or network conditions, on a per application basis. The instructions can be combined with a user preference and the traffic routing functions can be performed (e.g., binding user application/flow to a radio network device) based in part on the combination of user preferences and network considerations according to the self-organizing devices and corresponding network conditions or radio network performance settings. Consequently, the UE device can comprise the client network operating system or NOSA that can enable SON extension, wherein the UE device provides appropriate context to the SON device or servers and policy engines.

As the mobile industry moves towards Giga speed applications, the next-generation mobile packet cores could have the ability to automate the traffic flow management that meets application demands on the networks. The mobile packet core can be a device that operates the management of the radio access network and network devices operating the radio access network, such as for providing sessions or information exchanges, authentication, packet forwarding and like networking operations. The network devices herein can be a gateway support node device, a cellular management entity device, or a packet data gateway device for example, as well as other network devices functionally serving network communications for UEs and combinations of these devices communicatively coupled to one another.

FIG. 1 illustrates an example, non-limiting wireless communications environment 100 in accordance with various embodiments described. The wireless communications environment 100 can include a multitude of wireless communications networks, each having a respective coverage area. The coverage area of some of the wireless communications networks can overlap such that one or more network devices can provide coverage areas or zones to UEs or mobile devices whose coverage areas from different networks of network devices overlap. The network devices can operate with one another as a Self-Organizing Network (SON), in which at least some of the network devices can be configured to provide self-configuration and self-optimizing capabilities that provide the ability to automate certain operations, management functions and system management functions. The SON incorporates self-configuration, self-optimization, monitoring, and operation management to allow the network devices to be communicatively coupled into the network and operate with little to no human intervention while taking into account application settings for applications operating on and managed by the UEs.

The wireless communications environment 100 includes one or more broadcast servers 102, 104 (e.g., cellular servers) and one or more Wi-Fi access points 106, 108 deployed within the wireless communications environment 100 and servicing one or more UE devices 110, 112, 114, 116, 118. Each wireless communications network (e.g., broadcast servers 102, 104 and Wi-Fi access points 106, 108) comprises one or more network devices (e.g., a set of network devices) that operate in conjunction with one another in order to process network traffic for the one or more UE devices 110, 112, 114, 116, or 118. For example, the broadcast servers 102, 104 can comprise a set of network devices that are cellular enabled network devices, which could provide different network speeds (e.g., 2G, 3G, 4G, etc.). In another example, the Wi-Fi access points 106, 108 can include a set of network devices that are Wi-Fi enabled devices.

The communications environment 100 can include one or more management servers 130, 132 that are communicatively coupled to the network devices such as the broadcast servers 102, 104 as a control-node for one or more networks. The management servers 130, 132 can operatively control UE device tracking and paging procedures including retransmissions. The management servers 130, 132 can control, for example, the bearer activation/deactivation process and choosing a serving gateway for the UE devices 110, 112, 114, 116, or 118 at the initial attach and at the time of an intra-network handover (e.g., Wi-Fi to 3G, 3G to 3G or the like). The management servers 130, 132 can authenticate UEs by interacting with the other devices communicatively coupled thereto and/or sets of data servers such as a home subscriber server and the like. The management servers 130, 132 can operate in conjunction with one or more mobile packet core components having a processors and memory that can operate to generate and allocate temporary identities to UEs and terminates Non-Access Stratum (NAS) signaling or other signaling protocol layer. The NAS can be used to manage the establishment of communication sessions (e.g., between UEs) and for maintaining continuous communications with the user equipment as it moves. The management servers 130, 132 can also manage signaling to the Access Stratum for carrying information over the wireless portion of the network and security key management operations (e.g., authentication, verification, authorization operations) with UE application data and UE device functions. In particular, the network devices can operate together with the UEs to provide and separate management of network bandwidth, load balancing, self-organizing functions, traffic monitoring probes, traffic time shifting, offloading, preloading, and network policy to the applications and UEs managing the applications.

As illustrated, each of the one or more Wi-Fi access points 106, 108 can have a corresponding service area 120, 122. In addition, each of the one or more broadcast servers 102, 104 can have a corresponding service area 124, 126. However, the wireless communications environment 100 is not limited to this implementation and various other architectures can also be employed. For example, the self-organizing network devices can deploy any number of Wi-Fi access points and respective service areas within the wireless communications environment 100.

A UE device can contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or UE device. A mobile device or UE can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. In addition, the UE devices 110, 112, 114, 116, 118 can include functionality as more fully described herein such as one or more applications such as application software or bundled software and hardware processors for a particular set of useful tasks beyond the running of the computer itself. Examples can include accounting software, enterprise software, graphics software, media players, office suites and the like. An application, for example, can apply the power of particular a computing platform or system software to a particular purpose.

In one aspect, cellular broadcast servers 102, 104 and Wi-Fi access points 106, 108 can monitor and communicate with one or more applications on the UE and their surrounding radio conditions (e.g., by employing respective measurement components). For example, each of the cellular broadcast servers 102, 104 and Wi-Fi access points 106, 108 can determine network traffic load on its respective network by performing a network diagnostic procedure. As an example, during a network listen procedure, cellular broadcast servers 102, 104 and Wi-Fi access points 106, 108 can scan their radio environment to determine network performance statistics. Various parameters associated with cellular broadcast servers 102, 104 and Wi-Fi access points 106, 108 can be detected during the network diagnostic procedure, such as, but not limited to, frequency bands, scrambling codes, common channel pilot power, bandwidth across respective networks, universal mobile telecommunications system terrestrial radio access receive signal strength indicator, as well as application settings from the UE.

In an example scenario, networks can service UE devices 110, 112, 114, 116, and 118 through one of the cellular broadcast servers 102, 104, or Wi-Fi access points 106, 108. As a UE device travels within the wireless communications environment 100, the respective UE device can move in and out of the coverage area of the associated serving network. For example, as a user is sending/receiving communications through their respective UE device, the user might be walking, riding in a car, riding on a train, moving around a densely populated urban area (e.g., a large city), wherein the movement might cause the mobile device to be moved among various wireless communications networks. In such cases, it is beneficial to route the network traffic (e.g., handoff) from a serving network to a target network in order to continue the communication (e.g., avoid dropped calls). The routing, for example, can be dependent on one or more applications of a particular UE. The applications can have application settings that can dictate a set of network protocols and further comprise multiple different sets of network protocols based on one or more triggers or events that initiate a corresponding set of network protocols. The managing servers 130, 132 and the core components 134, 136 in conjunction with the other network devices of the SON can operate network functions according to the application settings and the set of triggers corresponding to a particular set of network protocols. The applications of the UE can have different sets of application settings, which can have priorities or a prioritization scheme based on one or more event triggers for operation of the application.

For example, as a driver enters a Wi-Fi area data, sharing or data transfer can transfer over to a Wi-Fi network according to the application settings for an application that is operating on the UE. A data transfer can occur based on an event or trigger, as discussed above, so that an application that requires a function with greater speed for data transfer could switch to a 4G network instead for a specified time period until the function is triggered to pause by a set trigger or event specified in the application settings. The data transfer could be stopped and made to continue automatically once a response from a particular party, UE, network device, or the like is received. The response or vote could operate as a trigger designated by the application settings. Multiple devices (e.g., UEs or other devices) can then share the information via the SON automatically subsequent to the SON devices performing an aggregation of the data. The data shared, for example, can be dependent on a different trigger and a different set of application settings or network protocols, which can be designated automatically by the application or the user manually via the application.

Depending on location, UE devices 110, 112, 114, 116, 118 can have the option to connect to any number of networks based on the application settings, for example. In one scenario, one of the cellular broadcast servers 102, 104 can service all the UE devices 110, 112, 114, 116, 118, which can cause excessive load on the respective cellular broadcast server and cause UE devices 110, 112, 114, 116, 118 to have a potentially negative user experience. The application settings could have a request for a data transfer or collection of data from one or more other UE devices. The application settings could indicate to the self-organizing devices of the network environment a desire for data speeds that are on one network, but not another. The settings could establish certain time-periods for a set of application settings to take effect, such as certain data speeds for the set time-period. The application settings can also comprise set triggers or events to switch networks and further continue with data transfer, stop data transfer, or establish data communication under different protocol priorities based on UE parameters such as battery, speed, direction, and network observed signaling, load, congestions and the like.

In another embodiment, UE devices 110, 112, 114, 116, 118 can connect to any available network based on real-time or near real-time network condition statistics and an intelligent network selection policy with a Network Operating System agent or kernel. In one example scenario, UE device 114 for example, can determine Wi-Fi access point 106 or Wi-Fi access point 108 offer a higher quality of experience and UE device 114 can connect to the selected Wi-Fi access point based, in part, on a network selection policy or data diversity policy included with specifications of the application settings. Further to this example, UE device 114 might determine cellular broadcast server 102 or cellular broadcast server 104 offer a higher quality of experience and UE device 114 can connect to the selected cellular broadcast server based, in part on the network selection policy designated by the application settings. According to another aspect, UE device 114 could split its communication traffic flows and use a selected Wi-Fi access point for a set of communication traffic flows and a selected cellular broadcast server for another set of communication traffic flows, based on the application settings provided to the network.

In some situations, when an option is available where a particular UE device can be serviced by either a cellular broadcast server or a Wi-Fi access point, the Wi-Fi access point can be selected automatically based on the application functioning requirements and as specified by the application settings of an application on the UE. For example, the UE device might have user preferences established within a particular set of application settings to occur at one event trigger (e.g., data sharing, delivery, UE sensed data, etc.), which indicates that when a Wi-Fi network is available, network traffic of the UE device should be routed to the Wi-Fi network. Another set of application settings associated with the same application could occur for another or different event trigger. Such application settings could vary between applications on a UE and for various trigger events that could occur. For example, certain application settings could establish a network speed or type of network because, in some cases, there is no associated cost to the user of the UE device when a Wi-Fi network is utilized, as compared to usage of a cellular network. Thus, the network traffic of the UE device could be automatically routed to the Wi-Fi network, regardless of the load on the Wi-Fi network and/or other considerations, which could result in a negative user experience (e.g., dropped communications, poor communications, and so on).

However, according to some aspects discussed herein, rather than automatically connecting to a Wi-Fi access point, other considerations can be utilized to route the network traffic of the UE device to the Wi-Fi network, or to determine that the network traffic should remain on the cellular network and/or move to a different cellular network or Wi-Fi network. For example, instead of moving to the Wi-Fi network automatically when the Wi-Fi network is available, a comparison is made between the Wi-Fi network and a cellular network. If the Wi-Fi network is more congested than the cellular network, the user traffic of the UE device can be routed to the cellular network. However, if it is determined that the Wi-Fi network is not as congested as the cellular network (or both networks have about the same level of congestion), the user traffic of the UE device can be routed to the Wi-Fi network.

According to various aspects discussed herein, a UE device can continuously, periodically, or based on other temporal conditions, receive data indicative of network statistics (e.g., network policy, traffic load or congestion on the network, capability of the network, and so on) according to the application requirements at the time. As network performance changes, a UE device can determine that at least a portion of its respective network traffic should be routed to a different network. The determination can be made based on real-time, or near real-time, network statistics.

In accordance with one implementation, a kernel serving as the NOSA can be implemented with the UE or external to a UE to facilitate communicate of application settings for an application managed by the UE to the network devices. The network devices can then initiate policies and based decisions such as handover, network conditions and load conditions (e.g., network congestion) based on the application settings. The network devices of the SON, for example, can take a self-organizing approach to diverse data delivery, self-organizing control considerations based on UE observed accelerometers, battery power, speed, direction, and network observed signaling, load, and congestions. A portion of these parameters can be communicated as part of the application settings in order to set corresponding limits or triggers for defining the particular needs of the application, providing the status of the UE and for prioritizing data delivery options between the UE and the SON.

In accordance with an implementation, a UE device can be configured to perform dynamic intelligent network selection per service provided based on a combination of an access network discovery and selection function policy, network conditions, and intelligence associated with the UE device. For example, the UE device can autonomously determine under what conditions to route network traffic and to which network (e.g., Wi-Fi radio or cellular radio) the network traffic should be routed on a per application basis (e.g., by splitting traffic flows). The decision can be made in such a manner that the decision has a positive impact on the user experience.

The access network discovery and selection function policy can be received from a network server that can be configured to push (e.g., broadcast) the information to one or more UE devices based on the application settings communicated or received by the network devices. The network selection policy can include logic that can instruct the UE device to select a network based, at least in part, on network statistics, which can include network conditions and load conditions (e.g., network congestion), or policies based on the UE parameters such as UE observed accelerometers, battery power, speed, direction, and network observed signaling, load, and congestions. According to some implementations, one or more network collection agents can monitor multiple networks and can periodically, continuously or repeatedly push/communicate updated network statistic information to the UE device. Such periodic and/or continuous updates can enable real-time or near real-time knowledge of the network conditions by the UE device and could further be implemented in response to one or more event triggers selected by or assigned to the application of the UE device.

Further, according to the various aspects described herein, the network selection can be based, in part, on an operator policy driven intelligent network selection and traffic steering capability based on the network conditions and the UE device intelligence that offers optimal (or as close to optimal as possible) and consistent user experience across all UE/operating system (OS)/original equipment manufacturer (OEM) platforms and manufactures.

A network can include a plurality of elements that host logic for performing tasks on the network. The logic can be hosted on servers, according to an aspect. In packet-based wide-area networks, servers can be placed at several logical points on the network. Servers may further be in communication with databases and can enable communication devices to access the contents of a database. Billing servers and application servers are examples of such servers. A server can include several network elements, including other servers, and can be logically situated anywhere on a service provider's network, such as the back-end of a cellular network, and managed by the packet core components 134, 136. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information.

Figure 2:
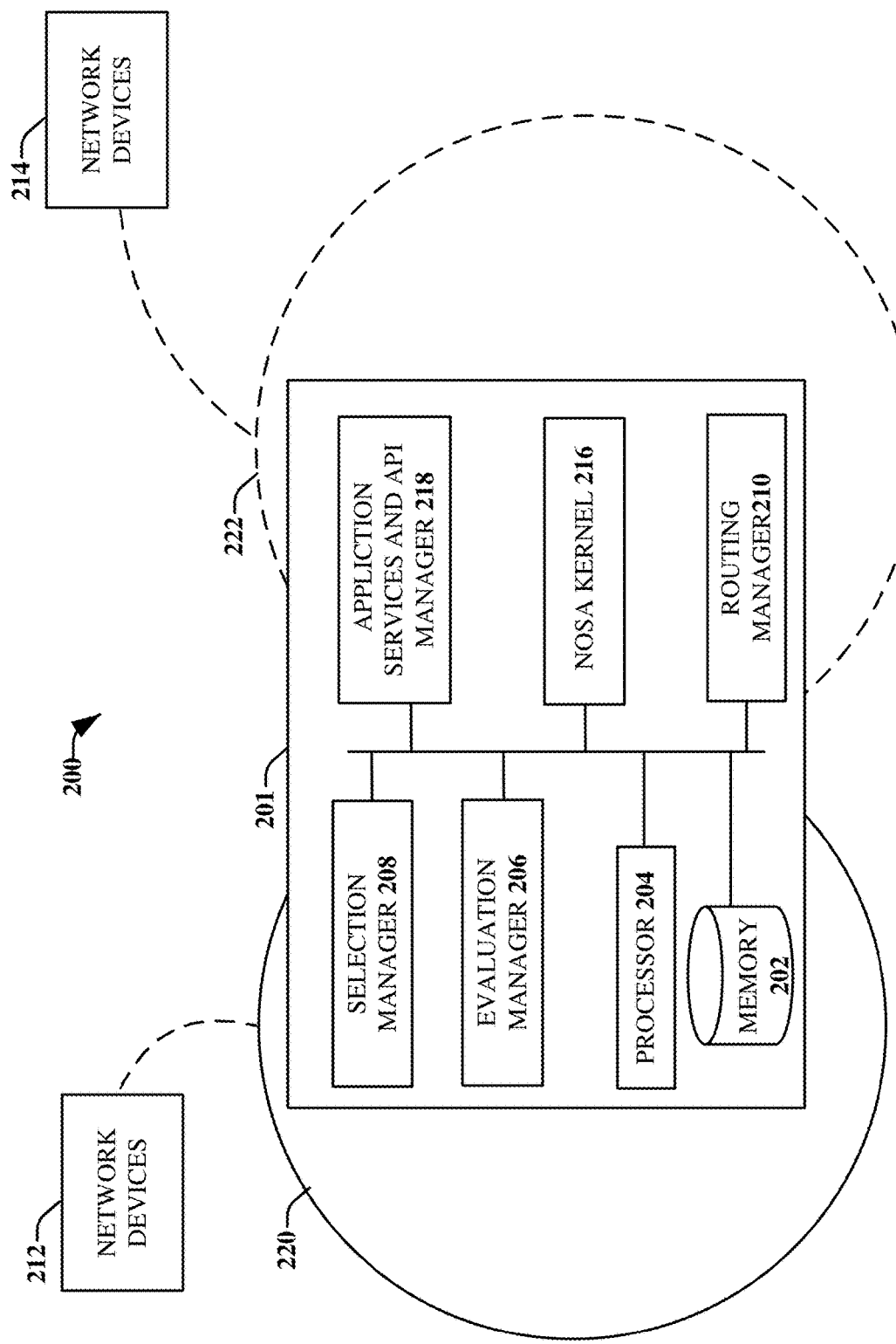
FIG. 2 illustrates an example, non-limiting system for establishing communications with network devices and applications of UE devices, according to an aspect.

FIG. 2 illustrates an example, non-limiting system 200 for establishing communication relationships between applications for a UE device and network devices, according to aspects described. System 200 can be implemented, for example, on a UE device 201 or be distributed throughout a set of self-organizing network devices in communication with the UE device. System 200 comprises at least one memory 202 that can store computer executable components and instructions. System 200 can also include at least one processor 204, communicatively coupled to the at least one memory 202. Coupling can include various communications including, but not limited to, direct communications, indirect communications, wired communications, and/or wireless communications. The processor 204 can facilitate execution of the computer executable components stored in the at least one memory 202. The at least one processor 204 can be directly involved in the execution of the computer executable component(s).

System 200 can comprise various components that can integrate with one or more UE device as an internal component, externally as network device or as a virtual component. The system 200, for example, can comprise an evaluation manager 206 that can be configured to compare one or more parameters associated with two or more wireless networks and further evaluate UE device parameters that comprise UE sensed data (e.g., accelerometer data, battery power data, speed data, direction data, network observed signaling data representing a signaling of the set of self-organizing network devices, load data representing a load of the set of self-organizing network devices, and congestion data representing a congestion of the set of self-organizing network devices).

According to one implementation, parameters associated with a first network can be compared to parameters associated with a second network and/or a parameters associated with subsequent (e.g., third, fourth) networks. The network parameters can further comprise the UE parameters that can be utilized for optimizing the application settings, selecting a set of application settings, the network device to UE device relations and providing network delivery options for data based on the parameters detected on the network and the UE. For example, the one or more parameters associated with the communications networks can include congestion conditions, network parameter conditions, or application conditions (e.g., event triggers such as predefined time-periods, location designations, network performance, the type of network, or other triggers). According to an aspect, the one or more parameters can include network load information. In accordance with another aspect, the one or more parameters can include bandwidth utilization of the network (e.g., 3G, 4G, long term evolution, and so on). Other parameters can include peak usage times, available bandwidth of a network, a number of requests received by a network resource, as well as other metrics or parameters, which can be specified certain events or functions for data delivery via one or more different sets of application settings of the UE device managed application.

In an implementation, a first wireless network can include network devices that are cellular enabled device (e.g., a cellular network) and a second wireless network can include network devices that are Wi-Fi enabled devices (e.g., a Wi-Fi network). Parameters related to the cellular networks can include cellular network congestion condition and parameters received through cell broadcast or a system information block(s). Dynamic cellular conditions include load information, signal strength thresholds, and/or subscriber profile based offset to signal strength threshold percentages. Parameters related to the Wi-Fi networks can include Wi-Fi network access point conditions, such as BSSI load condition, RSSI, and WAN metrics and/or performance measurements over the Wi-Fi network.

The evaluation manager component 206 can also be configured to compare the one or more network parameters, associated with the two or more wireless networks, with one or more parameters associated with the user equipment device. The one or more parameters of the user equipment device can include usage information (e.g., applications being executed (e.g., running) on the user equipment device). The parameters can also include a movement parameter of the user equipment device. The movement parameter can relate to whether the user equipment device is stationary or moving and, if moving, a speed at which the device is being moved and/or a direction to which the device is being moved. The speed and/or direction of the device can be analyzed with respect to a location of a cellular network and/or a Wi-Fi network, according to an implementation and provided to the self-organizing network devices, which can enable certain data delivery options according to the UE parameters and the application settings as a set of radio network performance settings. For example, if the user equipment device is being moved toward a network, that network might be favored over a network that the device is being moved away from, or not directly headed toward. A trigger, for example, could be designated in the application settings as well, such as switching to a Wi-Fi network device coverage when within a certain distance of the coverage area, stopping data delivery, or continuing data delivery upon entering the coverage area. In an example, speed and/or movement of the device can be determined based on a vibration pattern of the device. Other parameters can include user preferences and/or settings associated with the selection of a network for routing of network traffic. Further parameters can include a battery usage and/or remaining battery capability (e.g., battery life).

Also included in system 200 is a selection manager component 208 that can be configured to determine which radio technology (and associated set of network devices) should be chosen such that at least a portion of the network traffic of the user equipment (also referred to as user traffic) is routed to the selected network (e.g., by a routing manager component 210). For example, the comparison performed by the evaluation manager component 206 can produce various possible results. For example, a first possible result can be that at least a portion of the network traffic of the user equipment device should be routed to a first set of network devices (e.g., a first set of target devices), which are associated with a first radio technology (a first set of radio network performance settings). Further, a second possible result can be that the portion of the network traffic (or another portion of network traffic) of the user equipment device should be routed to a second set of network devices (e.g., a second set of target devices), which are associated with a second radio technology (e.g., a second set of radio network performance settings).

The system 200 can further include a selection manager component 208 that operates to make determinations for policy considerations. The determination performed by selection manager component 208 can comply with a network selection policy received from a network device that currently provides a service to the user equipment device (e.g., a set of source devices). In an implementation, complying with the network selection policy can include observing discovery information and selection policies of the serving network (e.g., set of serving devices). The discovery information can relate to one or more traffic routing rules established by the serving network. According to some implementations, instructions related to the network selection policy (e.g., how to route the user traffic) can be combined with the application settings set by the application or the user in order for the selection manager component 208 to make the network determination.

The application settings can include trigger events that are designated by the application, a user of the UE managing the application, or selected from a set of triggers provided by the network device, which could vary depending upon location or other UE parameters or UE sensed data, such as bandwidth requirements, location, speed, direction of travel, etc., as discussed above. For example, a cellular network 220 (3G, 4G, etc.) or a Wi-Fi network 222 can be chosen as a result of the cellular network condition when combined with the Wi-Fi condition for the determination based on the application requirements or set of application settings specifying the requirements. The application settings can enable the application to perform one or more operations by establishing context aware relationships between the UE applications and set of self-organizing network devices. For example, if the cellular network is loaded (e.g., high congestion) and the Wi-Fi network is not congested, under that condition, the Wi-Fi network can be chosen. However, if the cellular network is not congested and also the Wi-Fi network is not congested, the cellular network might be chosen, or not chosen depending upon one or more applications settings or UE parameters. Thus, the decision is made in part based on a comparison of both the networks and the context awareness of the application of the UE and UE.

The routing manager component 210 can be configured to route one or more portions of the network traffic of the user equipment device to the set of network devices chosen by the selection manager component 208. For example, the routing manager component 210 can be configured to change functionality of the user equipment device from a cellular connectivity function to a Wi-Fi connectivity function. In another example, the routing manager component 210 can be configured to change the functionality of the user equipment device from a Wi-Fi connectivity function to a cellular connectivity function. The routing manager component 210 is configured to perform the appropriate signaling between a source network and the target network to enable seamless handoff or routing of the user network traffic.

According to an implementation, the routing manager component 210 is configured to route a first set of network traffic of the user equipment device (e.g., a first set of traffic flows) to a first network and to route a second set of network traffic of the user equipment device (e.g., a second set of traffic flows) to a second network. For example, a cellular network might be congested and, therefore, some of the traffic of the user equipment device can be kept on (or routed to) a LTE network, for example. At the same time, a media application or video sharing application might be executing on the user equipment device and this set of traffic can be routed to (or kept on) a Wi-Fi network. In such a manner, different sets of traffic flows of the user equipment device can be split, wherein some of the traffic flows are routed to a cellular network while other traffic flows are routed to a Wi-Fi network. Such splitting of the traffic flows can be determined based in part, on the network policy, such as a network selection policy, for example, or the application settings, such as a price structure, performance requirements, or some other set of triggers. The triggers can be selected, set or modified by the UE or the network and can be communication to the network devices or SON from a selected set of application settings from the UE application to the network devices via the NOSA or operating kernel of the NOSA 216 at the UE, external or virtually through the network.

The NOSA kernel 216 can be configured to operate as a manager in a low-level abstraction layer for input/output requests from the applications being managed by the UE to the self-organizing network devices. The NOSA kernel 216 can be operatively connected to the UE operating system and is specialized for network operations and communications to the SON in order to provide network aware relationships for application functions. The NOSA kernel 216, for example, translates the application context (e.g., processes, interruptible tasks, threads of the application) to the network context (processes, interruptible tasks, threads of the network) to account for them in processing data delivery with the managing server and mobile packet core components of the set of self-organizing devices. The NOSA 216 can operate with the self-organizing devices to communicate and determine data delivery operations such as time-sharing, load balancing, resource allocation, time shifting of packet flows, cache operations, data packet segmentation and reassembly, and caching functions. The UE device can comprise the client network operating system or NOSA kernel 216 that can enable SON extension, wherein the UE device provides appropriate context to the SON device or servers and policy engines with application policies or settings on the UE device.

The system 200 further comprises an application services and application programming interface manager (API) 218. The application services and API manager 218 operates to manage underlying flow state information, information to manage dynamic pricing or billing, and integrate proper interfaces to manage micro shift data delivery. The application services and API manager 218 can further provide virtual service portals for new Quality of Experience (QOE) dependent business models, enable analytic and knowledge dashboards to applications on the UE device, and create personalized flow models and policy-based services for users, businesses and internal optimization tools. The application services and API manager 218 can communicate data with the NOSA kernel 216 to monitor cycle times, fallouts, end-to-end flow rates and quality of experience to make determinations of application settings to communicate to the SON devices 212, 214, for example. These components enable optimum quality of experience to UE devices and applications managed or controlled by the UE devices with network devices. The device component operatively communicate advantageously to eliminate manual configuration of equipment at the time of deployment, right through to dynamically optimizing application and radio network performance during operation, which increases alternative service offers for large data deliveries in wireless networks.

Figure 3:
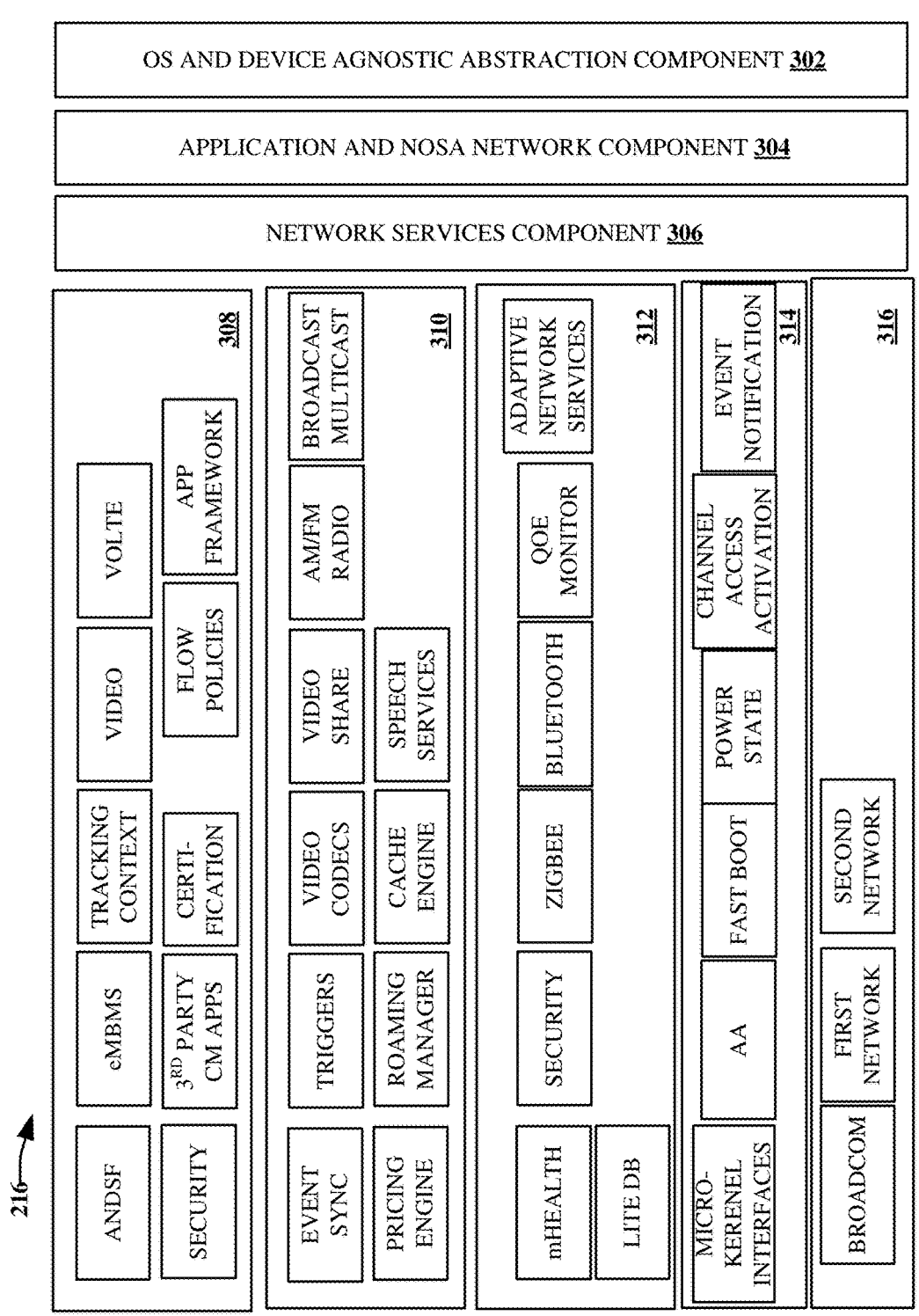
FIG. 3 illustrates an example, non-limiting network operating system agent kernel, according to an aspect.

FIG. 3 illustrates an example, non-limiting NOSA kernel 216 for generating close relationships between self-organizing network devices and applications of UEs to make the SON devices context aware. The NOSA kernel 216 can be implemented on a user equipment device, operate one an external device, a network device, or a cloud network. The NOSA kernel 216 comprises an operation system (OS) and device agnostic abstraction component 302, an application and NOSA network component 304, a network services component 306, a control manager application and context aware component 308, a control manager services and API component 310, a control manager extension component 312, an core control manager kernel 314 and a wireless system on a chip adaptation component 316. These components of the NOSA kernel 216 illustrates an example architecture for the NOSA kernel 216 to operate as a manager in a low-level abstraction layer for establishing relationships between the applications being managed by the UE to the self-organizing network devices.

The operation system (OS) and device agnostic abstraction component 302 is configured to operate as a manager for the operation system and the UE device context (tasks, threads, process etc.) and the network context. For example, network routing processes can be a set of context that comprises a different number of communication layers, each of which are responsible for handling some part of the end-to-end communication. Each layer, for example, can be tasked with a specific job or set of processing tasks, receives input from the OS, the device or the network, and produces output in a predetermined fashion. The operation system (OS) and device agnostic abstraction component 302 enables the communication of the context for the OS, the UE, and the network among the self-organizing network devices and different layers of the NOSA kernel 216.

The application and NOSA network component 304 is configured to communicate a suite or set of tools for the applications operating on the UE for communicating (e.g., displaying in a display or interfacing with applications) various application settings and enabling sets of application settings for performance parameters, functions and the like with triggers or events. For example, one set of application settings can indicate a power level threshold, a congestion level, a time shift, a priority level for a network bandwidth, offloading triggers, packet prioritization, network store and forwarding functions, and the like settings. Additionally, another set of application settings can be stored or configured to have different levels of each of these settings, different thresholds, or different triggers to instantiate the application settings with the self-organizing network devices. Consequently, the application and the network relationships can be context aware of one another and interact with communications that take into account the application settings and network conditions. Thus, the application settings can be communicated to the network devices and the UE device to be configured, modified or set based on the current conditions of the networks and the application functions associated with the settings.

The network services component 306 is configured to communicate network delivery options that can comprise current network conditions such as available networks to the application processes and managing UE device based on the current UE parameters and network conditions. For example, UE parameters (e.g., accelerometer data, battery power data, speed data, directional data) can be considered as trigger events for modifying or determining the optimal application settings by which the application not only operates on, but indicates to the network that it is either capable of operation with or will operate with. In cases in which a trigger is not met, the application could halt or stop certain functions, wait or continue processing with a different setting. The network conditions taken into account as the network delivery options can include congestion, network observed signal among devices for services conducted or provided by the devices, load data, congestion data. In response to the triggers that are met, a set of application settings can be communicated and implemented by a radio access network device, a managing server, a mobile packet core, or other network device to perform the application set real-time traffic profiling, analytic packet reprioritization, data time shifting and network store, forward functions, etc.

In addition, the network services component 306 can operate to communicate event triggers than a network device of the network environment could provide. These network provided triggers could be selected and stored in the application settings for a UE device to select from or set as the condition by with a network is chosen or by which some other application setting or parameter of the UE is made to operate in conjunction with network. For example, a San Fran network could trigger operation with a 3G network, a different Wi-Fi network, a micro cell network, a Macro cell network, a priority scheme, a data delivery scheme, etc. based on any event such as a geographical location from one building floor to another, one restaurant or another, one application function or another as initiated by the UE device and the like event triggers.

The control manager application and context aware component 308 is configured to modify a set of application settings of the user equipment device by changing particular settings (network type, bandwidth, speed, event triggers etc.) and a set of radio network performance settings of the set of self-organizing network devices with the user equipment device based on the set of user equipment device parameters. This can be done automatically or manually based on network conditions (large congestion, lack of or not of storage functioning, time shifting, loading and congestion policies specific to a network device or not specific, etc.). The control manager application and context aware component 308 can select a network delivery option as a preferred setting, which can include settings available for the network to provide. The application as a result of a defined trigger can tag sets of application settings by which the control manager application and context aware component 308 implements the delivery options to meet or exceed the particular application settings tagged for the event trigger. In addition, where a delivery option (data delivery option) is not able to meet or exceed an application setting, the control manager application and context aware component 308 can make a determination whether the application functioning would except a different data delivery option, set a different trigger (e.g., a wait period, or the like) or halt the application processes. The UE device functions can also be taken into consideration, in which application settings of other applications running could be affect depending on the hardware limitations and make similar determinations.

The control manager application and context aware component 308 can operate receive one or more inputs to communicate for network and application setting determinations. For example, an input can be a service provider access network discovery and selection function policy, which can be received through an S14 interface, for example, or other network communication interface. The access network discovery and selection function policy can include, according to an implementation, the access network discovery selection function capabilities and enhancements, for example, such as network conditions and user equipment device intelligence.

In addition, the control manager application and context aware component 308 can operate to facilitate determinations of data delivery options available and application settings for electronic Multimedia Broadcast Multicast Services (MBMS) or other similar services that enable a point-to-multipoint interface specification for existing and upcoming cellular networks, for delivery specifications for efficient delivery of broadcast and multicast services, both within a cell as well as within the core network. For broadcast transmission across multiple cells, the eMBMS or other like service specification can define transmission via single-frequency network configurations, for example.

The control manager application and context aware component 308 can further integrate or factor in determinations according to the importance of managing (monitoring as well as actively managing) networked applications for Quality of Experience (QOE), which can include various metrics such as availability, Mean Time to Repair (MTTR), and Mean Time Between Failures (MTBF) for networking applications managed by the UE devices. Transportation tracking and context operations can determine the tracking conditions based on the UE parameters discussed above. Video streaming and Voice over Long Term Evolution (LTE) networks or Internet Protocol (IP) can be monitored and selected in a determination for data delivery options. In addition, security options and applications can be considered with third party control manager applications or other NOSA kernel applications, and auto certification operations of application communications and processes, such as communication certification and security. The control manager application and context aware component 308 can further determine context for flow policies and application frameworks for applications as part of determining application settings, such as prioritization, congestion and bandwidth considerations for selecting a data delivery option. As discussed above, the selection manager component 208 (of FIG. 2) utilizes the access network discovery and selection function policy to perform selection of a radio network (e.g., a radio technology) or provide for such as an application setting together with the other functioning components discussed above.

The control manager services and API component 310 can be configured to monitor and process event synchronizations, in which more than one event can be synchronized across application settings, delivery options for radio network device settings of the self-organizing devices to prevent conflict. As discussed above, event triggers can be determined, provided as selection for setting, modifying or canceling within application settings. The triggers can be provided by the SON devices for selection, manually set, and modified for particular application settings associated with different applications or subsets of application settings that can be tagged with certain events.

The control manager services and API component 310 can further implement video codecs, video share processes, radio options, Broadcast, multicast, pricing algorithms according to the network data delivery options or radio network settings for such options, roaming manager activities, caching structures such as Network Access Storage in support of cross layer designs and applications and speech services, for example. The control manager services and API component 310 can further operate to extend carrier services from various network carriers with the above mention services, for example.

The manager extension control component 312 can be configured to support core management extensions between applications and the network devices such as for different implementations and applications. For example, mobile health can be supported via the network and UEs and be bridged on the network for receiving high priority or less priority within the application settings for data delivery with health services and information, as well as with security and emergency functions. Different communication protocols can also be implemented with certain applications with the network devices of the SON with the control manager extension component 312, such as Zigbee, Bluetooth, Vehicular communications, etc. Other networks and their communication protocols can be considered based on an application setting that can be broadband wide-area networks such as cellular networks, local-area networks, wireless local-area networks (e.g., Wi-Fi), and personal area networks, such as near-field communication networks. Communication across a network can be packet-based; however, radio and frequency/amplitude modulation networks can enable communication between communication devices using appropriate analog-digital-analog converters and other elements. The manager extension control component 312 can further operate to perform QOE monitoring, adaptive network services and database process controlling such as with Lite DB or other database engines in communication with the network via the NOSA kernel 216 based on application communicated request or settings.

The core control manager kernel 314 can operate to provide microkernel interfaces among the OS and UE device, multi core processing operations for specific applications and high speed data delivery, fast booting, power state monitoring and controlling based on UE parameters and application needs, instant channel access activations for emergency or other needs. Event notification can be controlled for indicating events to the user and further along to the network devices as the UE interprets events as occurring. The core control kernel manager 314 can further interpret and communicate a resource manager framework engine. For example, cross layer functions can be implemented for manually pairing between two devices, in timing, radio, network relationship states, resources and network discoveries. QOS can be guaranteed or made uniform at both ends of the devices or multiple Oss, such as operation with appropriate thresholds for VOLTE, for example, or other applications and their specific sets of settings. Reactions or responses can be set in the application settings for network devices for degradation of voice with reserved bandwidths that can be utilized at a per cell level, for example.

The wireless system on a chip adaptation component 316 can be configured to implement various network integrations with the NOSA kernel 216 to be able to provided network and application relationships across different networks such as in different countries or different communication entities or proprietary entities.

As provided herein, the disclosed aspects enable dynamic intelligent network selection per service provider policy based on a combination of an access network discovery and selection function, network conditions, UE device intelligence, and application settings of one or more applications managed by one or more UEs.

Figure 4:
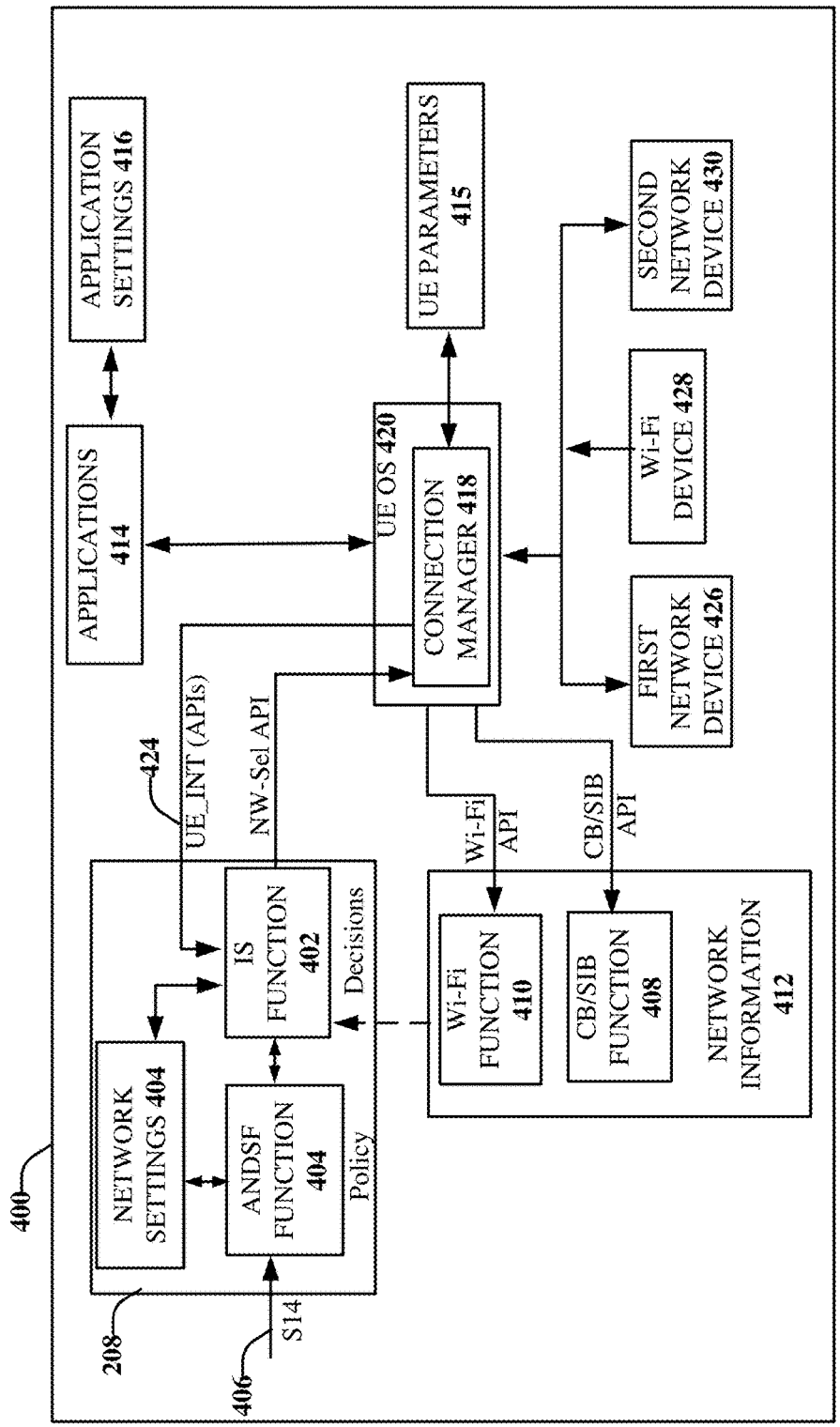
FIG. 4 illustrates an example, non-limiting implementation of a network control manager architecture for a user equipment device, according to an aspect.

Referring now to FIG. 4, illustrated is an example system 400 that establishes connecting relationships between self-organizing network devices and applications 414 of UE devices detected by the SON devices. Included in system 400 is an intelligent selection function 402 (IS function) that preforms different operating functions to determine network selection decisions as to which radio access network, when, under what conditions network traffic (of the user equipment device) should be routed, what radio network settings should be established, and application settings 416 for optimizing application functions, which are based on different types of input. In order to perform these functions, a connection manager 418 aggregates data from different network devices and the UE device. The connection manager 418 operates as the NOSA or NOSA kernel discussed above, for example. Examples of information received at the UE device include radio network settings such as network congestion conditions, network bandwidth, load balancing data, self-organizing functions, traffic monitoring probe data from traffic monitoring probes, traffic time shifting, offloading, preloading and network policy data to the applications 414 of the UE device and the UE device. Examples of information generated by the UE device include usage information, movement data, accelerometer data, battery power, speed data, direction data, and network observed signaling.

For example, the connection manager 418 can operate to receive a service provider access network discovery and selection function (ANDSF) policy, which can be received by an ANDSF policy 404 (ANDSF function). The service provider ANDSF can be received through an S14 interface 406 for example. The ANDSF policy 404 can include, according to an implementation, the 4GPP ANDSF capabilities and enhancements, such as network conditions (load, probe data, congestion, bandwidth, etc.), as well as other network conditions (3GPP, Wi-Fi, etc. from the SON devices. The selection manager component 208 (of FIG. 2) utilizes the ANDSF policy 404 to perform selection of a radio network device for a network to connection with or application settings 416 to be received via a network delivery option. The selection manger component 208 can receive UE device intelligence to make determinations for selecting sets of application settings 416 and radio network settings such as a particular type of network, bandwidth, storing, speed, etc.

The connection manager 418 can communicate cellular network congestion conditions, UE parameter data by a cell broadcast (CB)/system information block (SIB) function (illustrated as CB/SIB function 408). The CB/SIB function 408 can be a cellular network intelligent function on the user equipment device that receives and/or extracts various dynamic cellular network condition(s) and/or parameter(s) from the cellular network. A cellular network condition, for example, can relate to load information, which can be in the format of a load flag and received from one or more monitoring probes communicated by the UE device via the connection manager 418. For example, the load flag can be color-coded (e.g., red, yellow, green, and so forth) to indicate the amount of network traffic (e.g., load) on that particular cellular network. In another example, another manner of indicating the load information on the cellular network can be utilized (e.g., a pie chart, a line chart, based on a number of lights illuminated, and so on).

Another cellular network condition can relate to signal strength thresholds. For example, a signal strength threshold is a reference signal received power (RSRP) over the reference signal subcarriers, in a long-term evolution (LTE) implementation. In another example, a signal strength threshold can be a reference (received) signal code power (RSCP) in a universal mobile telecommunications system (UMTS) implementation.

A network profile can relate to a subscriber profile based on an offset to signal strength thresholds or a profile of application settings comprising different subsets of application settings ranked according to priority to a corresponding application on the UE. For example, a UE device associated with a first signal strength threshold can be ranked differently than another UE device associated with a second signal strength threshold based on different application settings for an operating application respectively. In an implementation, the various thresholds can be associated with different colors. For example, the first signal strength threshold and a second signal strength threshold of different users can be coded for different priorities, as well as different application settings tagged for implementations according to different event triggers or different priorities depending on the radio network settings or conditions of a network profile.

Another cellular network condition or profile can be a load condition or a percentage of bandwidth that can be used to move portions or sets of the user equipment devices between cellular networks and Wi-Fi networks. For example, a threshold level of a number or percentage of users that can be adequately serviced by a particular network could be utilized. According to this implementation, when the threshold level or threshold percentage is reached (or almost reached), no new user equipment devices might be routed to that network until the amount of user equipment devices serviced by the network is below the threshold level. In an example, the percentage can be indicative of a congestion percentage (e.g., based on total available bandwidth, used bandwidth, or capable bandwidth verses used bandwidth).

Another input can be a Wi-Fi network congestion condition and one or more Wi-Fi network parameters, illustrated as a Wi-Fi function 410. The Wi-Fi function 410 can relate to a Wi-Fi network condition function on the user equipment device that receives and/or extract Wi-Fi access point conditions. One condition can be a basic service set (BSS) load condition. Another condition can be a received signal strength indicator (RSSI). A further condition can be wireless access node (WAN) metrics via HotSpot2.0. Another condition can be a performance measurement over the Wi-Fi network, which can include round trip time (RTT) delay, jitter, packet loss, and so on.

The CB/SIB function 408 and the Wi-Fi function 410 represent network information 412. Such network information can be utilized by the evaluation manager component 206 (of FIG. 2) to perform network comparisons based on the application settings 416 and UE parameters 415 of the UE device. For example, the network information is utilized with the information obtained related to the user equipment device and the application settings 416 to perform the comparison and thereby communicate data delivery options among the network device resources of the SON devices for application functions. In cases in which the application settings 416 correspond to a particular set of application settings 416 and are not able to receive the resources for an application function, the application function can be halted for a timed period or the application settings can be modified to another set of application settings for the application function. In addition or alternatively, other application functions could be selected or provided as options in a dashboard or interface control to the UE device.

A further input for determining application and network settings for the UE applications over various network devices among SON networks can be user equipment device intelligence. Such information can include applications 414 executing on the user equipment device. For example, some applications might be better served by a cellular radio (e.g., cellular network), while other applications might execute well on either cellular networks or Wi-Fi networks. The same applies for various bandwidths, speeds, storage configurations, security policies, cross layer QOS and feedback loops with the devices and applications at large, billing policies, load and congestion policies and other data delivery options that are scalable or not with Quality Control Bits (QCB), in which different applications or sets of application settings could be different for these data conditions based on upon the specific requirements and/or data triggers that are tagged to the application settings on the UE devices. If an application executing on the user equipment device might not function properly on a Wi-Fi network, the decision to route the network traffic to the Wi-Fi network might be delayed and/or disabled, based on a trigger event, and then possibly reinitiated based on another trigger event. In another example, traffic flows might be split so that some traffic flows utilize the Wi-Fi network while other traffic flows utilize the cellular network or another network device, (Macro, Micro Femto cell device).

Another input can include user preferences. For example, a user preference might be to route the network traffic to a Wi-Fi network whenever a Wi-Fi network is available. Such user preference is taken into consideration when a determination is made whether (or not) to route the network traffic to a Wi-Fi network. In some instances, the traffic will not be routed to the Wi-Fi network even though the Wi-Fi network is available and is preferred by the user (e.g., user preference). These user preferences can be part of the application settings, in which the settings for a billing scheme are entered to provide Wi-Fi access for VoIP calling when the UE device is within an area of coverage or for data delivery options such as communicating other data for sharing, aggregating and delivering on Wi-Fi versus a cellular network device. With faster speeds required, a 4GPP option could be a data delivery option or a radio network performance setting that is indicated or selected according to the application settings. Other examples and scenarios as this can also be envisioned with different networks, speeds, bandwidths, policies and other consideration discussed herein with the applications of a UE, the application settings of the corresponding applications, and the radio network settings for a diversity of data delivery options.

A connection manager 418 can be included as a portion of the user equipment device operating system (OS 420), such as the NOSA kernel discuss above. The connection manager 418 can comprise instructions or actions on how to route user traffic to the proper radio (e.g., Wi-Fi radio or cellular radio) on a per application basis (e.g., as a function of the applications 414 executing, or expected to be executed, on the user equipment device), by splitting the traffic flows. It is noted that the term "connection manager" can refer to any entity that performs a traffic routing function (e.g., such as a routing manager component 210). The connection manager 418 also communicates application requirements (settings) for an application from the UE device and radio network settings as data delivery options from the set of SON devices or network environment, in which the UE finds itself. For example, the connection manager represents an entity that binds user application/flow to a radio network and further bridges connections there-between as a kernel, for example, among the OS kernels. The connection manager can be a native connection manager, a connectivity engine, or the like.

User equipment device intelligence can relate to intelligent network selection (e.g., INS function 402), which can relate to various information that can be known (or generated) internal to the user equipment device. Such intelligence can include battery usage level (e.g., amount of battery life remaining, statistics as to the amount of battery being consumed for various applications and/or programs executing on the user equipment device, and so on). Another example of user equipment device intelligence relates to the user equipment device relative movement to the Wi-Fi access point. The relative movement can include speed, vibration patterns, and so on. For example, relative movement can relate to whether the user equipment device is stationary or is moving and, if moving, the speed at which the user equipment device is being moved. In another example, the relative movement can relate to a direction that the user equipment device is being moved relative to the locations of the various radio networks. This information can be received from the connection manager 418, illustrated at 424, according to an aspect.

As discussed above, the "connection manager" is a generic term that refers to an entity, such as the NOSA kernel discussed above, which takes the input from the user preference and operator intelligent network selection instruction and performs a traffic routing function. For example, the connection manager can bind user application/flow and settings to a radio (e.g., cellular radio 426 and/or Wi-Fi radio 428) and radio network settings. The connection manager can be a native connection manager, a connectively engine, or the like.

Figure 5:
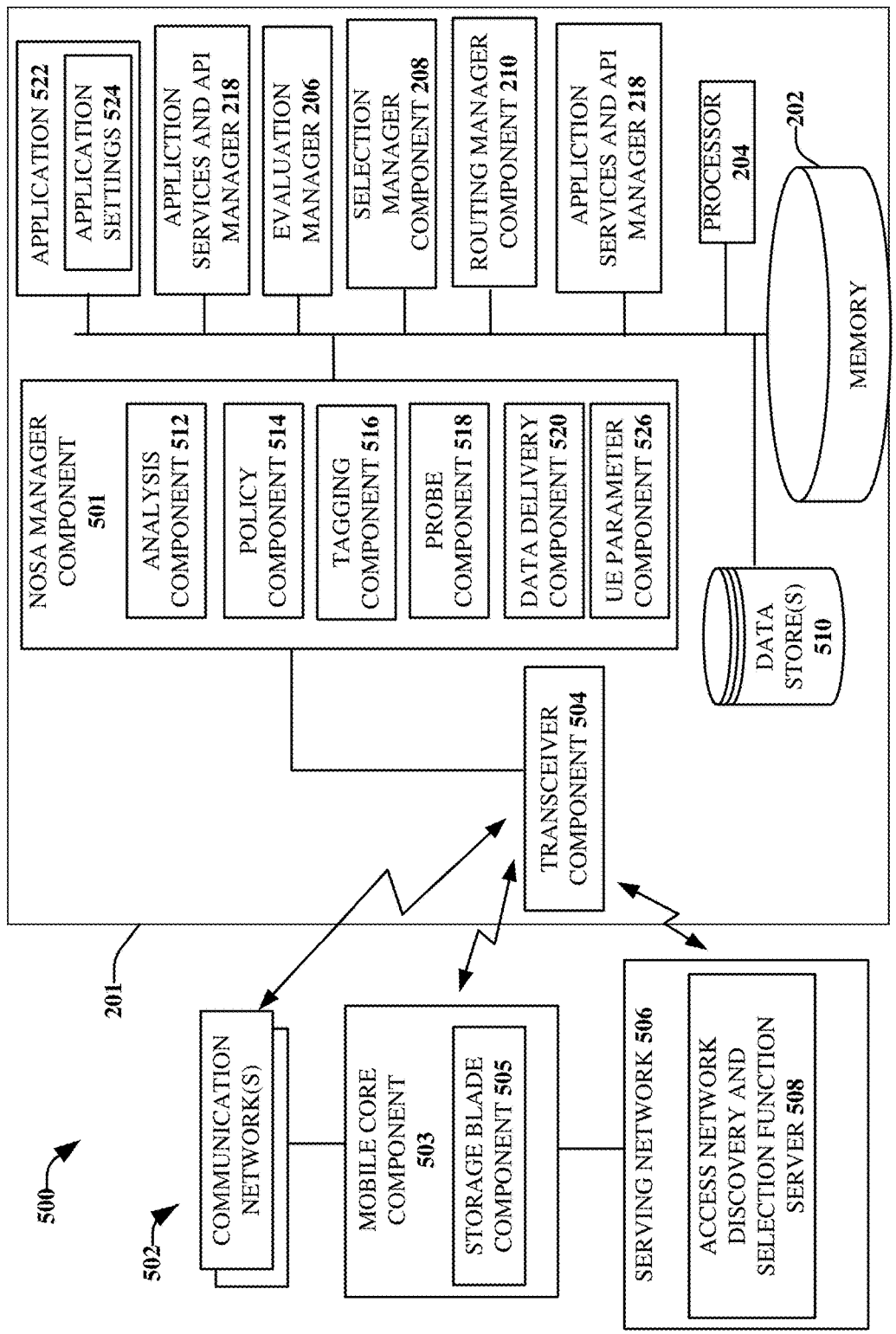
FIG. 5 illustrates an example, non-limiting system for network communications between communications networks applications of a UE device, according to an aspect.

FIG. 5 illustrates an example, non-limiting system 500 for managing network functions to applications of UE devices, according to an aspect. System 500 includes a memory 202 and a processor 204 operatively connected to the memory 202. A NOSA manager component 501 can operate as a managing kernel that is communicatively couple to the OS of the UE devices and configured to compare various parameters of one or more communications networks 502 with various parameters of a UE device and applications 522 managed by the UE device. NOSA manager component 501 can be operatively connected to a transceiver component 504 that can be configured to receive the various parameters (radio network settings) from the one or more communications network devices 502 (e.g., SON network devices) and communicate UE parameters aggregated by the UE parameter component 526 and applications settings 524 of the application 522.

For example, each communications network of the one or more communications networks 502 can monitor parameters related to network congestion and/or other network parameters. According to an implementation, the parameters can include, but are not limited to, traffic load over the network, and available bandwidth of the network. Other parameters can include, but are not limited to, signal strength thresholds, received signal strength indications, subscriber profile based offset to signal strength thresholds percentage, speed, bandwidth, data time shifting, network storage, real time traffic profiling, analytics packet reprioritization, and/or forward functions.

The NOSA manager component 501 can comprise various components to establish tight relationships with the UE device operation system and network devices such as the core components (e.g., mobile core component 503) and the serving network 503, which operates as a managing server. The NOSA manager component 501 can comprise an analysis component 512, a policy component 514, a tagging component 516, a probe component 518, a data delivery component 520, and a UE parameter component 526 for managing and facilitating close relationships between the network devices of a SON network environment and applications 522 managed by a UE device on the network.

Transceiver component 504, or another system 500 component, can be configured to obtain network selection policy information for a serving network 506, (e.g., from a network device that provides a service to the user equipment device). The network selection policy information can include discovery information and selection policies of the serving network 506.

For example, the serving network 506 can comprise an access network discovery and selection function server 508 that can utilize network security techniques to communicate securely with a selected group of user equipment devices. For example, access network discovery and selection function server 508 can authenticate select user equipment devices, application functions on the UE device, and allow only those user equipment devices or applications that are serviced by a particular service provider to communicate with the access network discovery and selection function server 508. Further, access network discovery and selection function server 508 can utilize secure channels, encoded channels, encrypted channels, and the like to perform communications within a wireless network environment.

Access network discovery and selection function server 508 can create and determine network traffic steering rules (or routing rules). The network traffic steering rules can be created for individual user equipment devices or for groups of user equipment devices and implemented based on the application 522 requirements, UE parameters ascertained by the UE parameter component 526, or the network resources and policies available to the application 522. In one or more implementations, access network discovery and selection function server 508 can create group network traffic steering rules for groups of user equipment devices based on, for example, subscription profiles, quality of service agreements, user equipment device type, user equipment device capabilities, application specific policies and resources, and so on.

According to an implementation, a network traffic steering rule can include instructions to guide a user equipment device in connection with radio access network selection or provided to the application 522 for implementing settings according to the rules, policies and resources communicated from that serving network that are available with the mobile core component 503. For example, a traffic steering rule can include instructions for radio access network selection, or radio network settings based on network load condition, mobility states, user equipment device hardware metrics or parameters, user equipment device performance metrics, application settings 524 and so on. The selections and network settings can be communicated to the transceiver component 504 in order for the NOSA manager component 501 to enable application functions to be implemented with the application 522 according to the application settings 524. Additionally or alternatively, the NOSA manager component 501 can modify the application settings 524 to operate under different conditions than the settings specified or configured in the application 522. Thus, the NOSA manager component 501 can operate to detect what the application 522 demands are from the network devices (communication network 502, mobile core component 503, serving network 506) and enable the network to command what resources (data delivery options) that the application is capable of performing with.

The application 522 can operate on a UE device (e.g., laptop, mobile, or cloud service, etc.). For example, the application 522 could be in the cloud network or storage, in which a UE browser can facilitate operation. The application 522, for example, can be a browser or another application 522 demanding data delivery. The application 522 can translate the user's request to some actionable network request. The NOSA manger component 501 operates to extending the network to agents or network OS agents that can handle activities (e.g., data delivery) demanded by the application 522.

The mobile core component 503 (e.g., core back-end processor) can comprise an integrated storage blade component 505 (e.g., storage blade or the like network memory managing system). The mobile core component 503 can operate with the radio access network or communication network 502, and is configured to control the sessions, authentication, packet forwarding, etc. The mobile packet core component 503 includes a storage blade, which can also be communicatively coupled into the RAN 502, which can provide opportunities for mobile delivery diversity so the packet data can be a part of the mobile packet core 503 for specific delivery time, delivery based on some special triggers, or events, and so on.

Further, the access network discovery and selection function server 508 can create one or more traffic steering rules when a new subscription is created, when a subscription is modified, when a user equipment device location changes, application settings, triggers events are modified, UE parameters change and so forth. Thus, access network discovery and selection function server 508 can create and/or modify traffic steering rules and store the traffic steering rules in one or more data stores 510 (e.g., a library) for future use. The NOSA manager component 501 can be further configured to communicate these rules, policies, or resources available to the application 522. The application 522 can be halted based on a trigger event occur, which can include an inadequate resource or an expectation of inadequate resource from a particular network based on UE parameters (speed, movement direction, location, accelerometer data, etc.). The NOSA manager component 501 can modify the application settings 524 in anticipation of the application 522 operating at a different level or different data delivery option, which can be for a period of time, indefinitely, or a specified delivery time, according to a trigger event.

The trigger events can be specified by the application 522 or the serving network 506 and tagged by a tagging component 516 of the NOSA manger component 501. The tagging component 516 can be configured to set or assign different priorities to different triggers according to the policy component 514. For example, caching functions, segmentation and packet reassembly, time shifting of certain packet flows can be considered or tagged in order accommodate load balancing requirements with the application 522 and the network devices. Thus, the NOSA manager component 501 can control tagging mechanisms via the tagging component 516 that enables such functions inside the networks 502. In one example, the UE device or application 522 on the UE device can initiate the data flow that has some policies associated with it via the policy component 514 being initiated at home, but as the UE device moves, such as within a car or moves at a faster speed thereby changing the UE parameters ascertained by the UE parameter component 523, networks could be changed from a trigger event being communicated to the network. In addition, network conditions and load and congestion policies could be changed by the network and/or the application settings. These policies could be tagged and/or changed as these conditions change by the NOSA manger component 501. The NOSA manger component 501 is configured to know what the critical packets or critical data packet units are for data delivery and can monitor network resources available via the probe component 518 to make sure those get delivered, by signaling network devices, UE parameters and application demands (application settings), in order to make delivery continuous and maintain a quality of experience as these data flows are communicated with the network dynamics.

In another example, the storage blade component 505 or other network attached storage to the mobile packet core component 503 and/or RAN environment operates to perform according to the tags of the tagging component 516, in which the tags can operate as stop signs on the network when the receiver or transceiver 504 is not ready or when the data is not properly formed, formatted/shaped or aggregated for proper delivery. For example, the data of the application 522 can be halted until an aggregation of data occurs, and then delivery in the appropriate setting or manner by the NOSA manger component 501 and to the storage blade component 505 for proper delivery or packet flow in real time with caching, network attached storage (NAS) and the like that is aware of the application demands according to a data flow policy or option.

For example, an application could be operating on a UE device by doing social networking or trying to collect data from the server, in which a trigger could be tagged or a set of application settings having certain network demands via the tagging component 516. The trigger could designated whoever has a highest priority as soon as his work convenes, then the application 522 could trigger that the data aggregation is complete and the results are to be shared, rather than constantly sharing data as it is received. In addition, the triggers or events could be requested from inside the application, where the application says start gathering what everyone is thinking on this vote, until the one person provides his or her votes, a certain machine or other UE device returns votes, or a predefined time elapses, until then continue collecting information within this social environment within a particular data stream until a certain event/trigger happens. A trigger, for example, could be a period of time, someone else's action or any other event. Applications can define their own triggers that initiate data delivery such as to continue collecting data, operate another task inside network or application, halt delivery to any UE device until another UE is close enough from a GPS perspective or other geographical location sensed to initiate a trigger for data delivery based on available network resources or devices. In addition, a network can have triggers set or tagged for application 522. For example, a Wi-Fi network could have sixty triggers that are discoverable by the application. In addition, the UE device enter onto a San Francisco street network that has another set of triggers discoverable by the same app. Thus, the UE can tag certain triggers from the network or the application, activate or handle different triggers based on the UE or application demands.

In some implementations, access network discovery and selection function server 508 can communicate traffic steering policies to the UE device (e.g., UE device 201 of FIG. 2, or other UE device communicatively coupled to the components of FIG. 5). In one aspect, access network discovery and selection function server 508 can assist the UE device in discovery of non-third generation partnership project access networks (e.g., Wi-Fi or worldwide interoperability for microwave access). In another aspect, access network discovery and selection function server 508 can select appropriate traffic steering policies for a user equipment device and issue the policies. In one aspect, access network discovery and selection function server 508 selects the traffic steering rule based on the policies associated with the UE device via the policy component or application 522 such as a user subscription, a user account, or other classification associated with a UE device. In another aspect, access network discovery and selection function server 508 communicates the appropriate traffic steering policy over a communication framework. In an aspect, access network discovery and selection function server 508 can communicate directly with UE devices through a server to client connection (e.g., standard S14 interface). However, access network discovery and selection function server 508 can communicate with UE devices through an indirect connection, a cellular broadcast, and the like, in accordance with some implementations.

The policy information provided by the access network discovery and selection function server 508 can be retained in the one or more data stores 510, the storage blade component 505, or by the policy component 514. According to an implementation, one or more data stores 510 can be integrated with the NOSA manger component 501, the other component coupled there, and/or memory 202. In another implementation, one or more data stores 510 can be located external to, but accessible by, the NOSA manger component 501, the other component coupled there, and/or memory 202.

The evaluation manager component 206 can to receive information related to the user equipment device and operate in conjunction with the NOSA manger component 50. For example, usage of the UE device can be received by the evaluation manager component 206. The usage can indicate how the device is being used (e.g., voice call, data call, streaming video, surfing the Internet, and so forth). The usage can also indicate the applications being executed on the user equipment device, wherein more than one application might be executing at any particular time. Some applications might perform better (e.g., have a better connectivity) with a cellular network and other applications might perform as expected on either a cellular network or a Wi-Fi network. According to an implementation, traffic flows of the user equipment device can be split between radio networks as discussed herein.

Other information related to the user equipment device and received by the evaluation manager component 206 can be one or more mobility parameters of the user equipment device. A mobility parameter can relate to whether the user equipment device is stationary or is moving and, if moving a speed at which the user equipment device is being moved. For example, the user equipment device might be stationary (e.g., a user of the user equipment device is sitting at her desk). In another example, the user equipment device might be moved and traveling at different speeds, which can be a function of the mode of transportation (e.g., walking, riding a bicycle, in a car, on a train, in an airplane, and so on).

Another parameter relates to the direction that the user equipment device is being moved. The direction can be a horizontal direction, which can be associated with cardinal directions or cardinal points (e.g., north, south, east, west, or intermediate points). Further, the direction can include an altitude (or changes in the height) of the user equipment device. For example, the user equipment device might be traveling in an elevator and a range of one network might not reach all points along that altitude (e.g., connectivity is only enabled at the higher locations).

An analysis component 512 can be configured to compare the information related to the networks and the information related to the user equipment device. For example, if a network has a congestion condition that is near, or approaching, a maximum congestion level, that network might be removed from consideration. In another example, if the user equipment device is being moved toward a network, the evaluation manager component 206 and/or analysis component 512 can take into consideration the movement of the user equipment device and might give more consideration to the one or more networks that are expected to be located along the movement path of the user equipment device.

A policy component 514 can be configured to review the recommendation provided by the analysis component 512 and determine if the selected network complies with the access network discovery and selection function policy of the serving network 506. According to some aspects, the policy component 514 ascertains whether a network conforms to the policy, which could be a set of application settings or demands, before the analysis component 512 analyzes the information related to the network. Thus, if a particular network does not conform to the policy, that particular network is not considered by the analysis component 512. Further, information related to that network is not obtained (or is disregarded if such information is obtained).

Based on the recommendation of the analysis component 512, a selection manager component 208 can determine to which radio technology or radio network (e.g., set of network devices) the network traffic of the user equipment device should be routed, or select from options that are communicated via the data delivery component 520 for different network delivery options or networks available (e.g., 3GPP, 4GPP, Wi-Fi, Femto cell, Macro cell, etc.). For example, the comparison by the analysis component 512 might reveal that although various networks could properly service the user equipment device, based on user preferences, only cellular networks should be used, which can be based on a pricing engine or billing tier, or other events being tagged. In another example, the networks could service the UE and the application based on user preferences, application settings etc. according to one or more triggers initiating a set of tags for one or more sets of application settings, in which Wi-Fi networks should be used, where feasible or other data delivery option comprising one or more storage options, packet flows, or other resource considerations. In a further example, based on an application (or multiple applications) executing on the user equipment device, a particular radio technology (or more than one radio technology) can be selected for at least a portion of the user traffic.

A routing manager component 210 provides the appropriate signaling to the source network and the target network in order to route at least a portion of the network traffic of the user equipment device to the selected network. Such signaling can utilize various types of signaling as a function of the network types and other parameters.

In another embodiment, the application services and API manger 218 can further be configured to operate a scalable application level control ring that operates as a network level ring. The network level ring analyzes the tags of the tagging component 516, which can be set by the NOSA manger component 501 or NOSA kernel. The network level ring of the application services and API manager 218 can function as another layer on top of the existing switches or routing devices for providing routing in consideration of the tags related to the application settings, or the data delivery options for a set of radio network options (performance options). The tags could be set for different subsets of applications settings to be triggered according to event triggers specified in the application settings or by a particular network. The data delivery options can be based on a data delivery trigger occurring to satisfy a data delivery that is controlled or selected by the application performance or demand level specified by the set of application settings. The application services and API manger 218 can therefore control the application level control ring and switch networks, or select other data delivery options by specifying the network or other radio network performance settings for network resources. The data delivery options can comprise a different network device option that selects a different network device of the self-organizing network devices to deliver data than a current network device (e.g., from a cellular network device to a Wi-Fi network device). The data delivery options can include a network observed signaling data representing a signaling of the set of self-organizing network devices associated with a network device option of the set (e.g., packet priority, time shifting functions, signal threshold levels, storage management processes available, etc.). The application services and API manager 218 can thus communicate to underlying switches of routers in the network the application level ring with tag information for particular applications operating on the UE for the router devices or network devices to consider along with other tags and switching concepts for network operation. For example, the application services and API manager 218 can provide another level of routing, switching and aggregation at the transport layer and up before data is processed back down for communications.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 6:
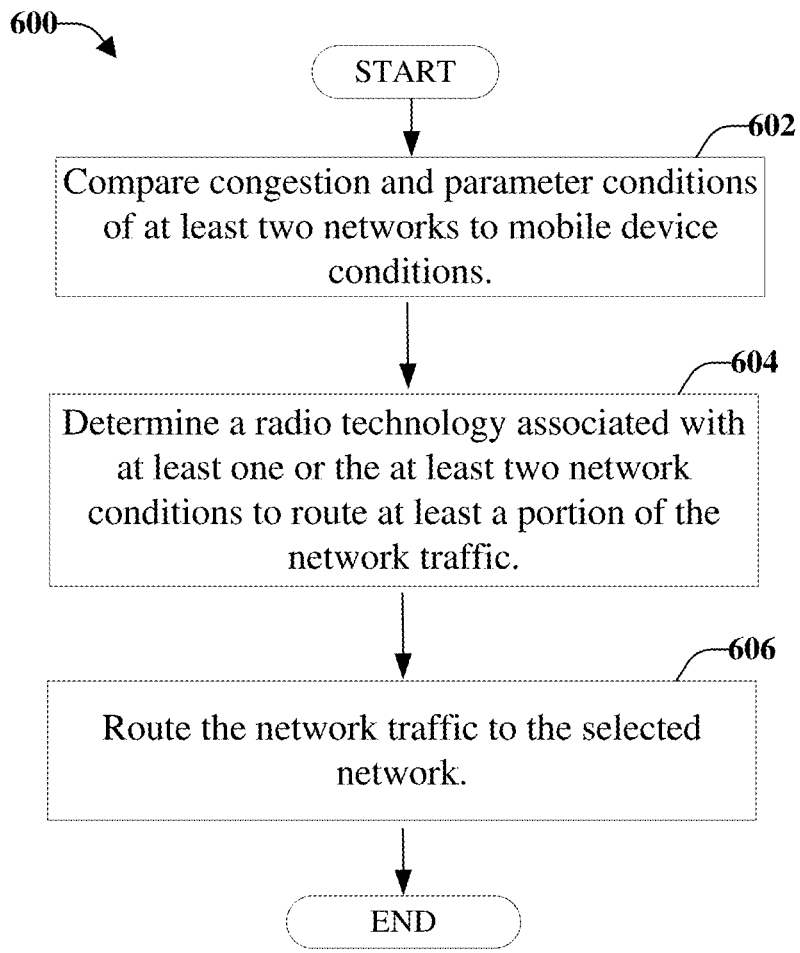
FIG. 6 illustrates an example, non-limiting method for routing network traffic, according to an aspect.

FIG. 6 illustrates an example, non-limiting method 600 for routing network traffic, according to an aspect. At 602, network congestion conditions and network parameter conditions related to two or more communications networks are compared with a usage and a movement parameter of the mobile device and considering the application settings for particular applications managed by a UE device. The network congestion conditions and network parameter conditions can be received from respective networks (e.g., respective sets of network devices included in each network). The usage and movement parameter of the mobile device can be obtained internally from the mobile device and application settings from the application via one or more components discussed above.

At 604, a determination is made as to a radio performance settings associated with at least one of the set of network devices to which at least a portion of the network traffic of the mobile device can be routed or is currently operating data delivery. The determination can include considerations related to adhering to the discovery information and selection policies associated with a set of network devices of a serving network (e.g., source network). For example, if a particular network is not an appropriate network according to the discovery information and selection policies (e.g., groups or subsets of applications settings based on one or more tags for trigger events), then that network is removed from consideration or the application setting themselves could be modified.

Network traffic of the mobile device is routed, at 606, to the selected set of network devices for different radio network performance settings. According to some aspects, a portion of the network traffic of the mobile device can be routed to a first set of network devices associated with a first radio technology and another portion of the network traffic of the mobile device is routed to a second set of network devices associated with a second radio technology. For example, traffic flows of the mobile device can be split between the first set of network devices and the second set of network devices based on one or more application functions or processes being initiated.

Figure 7:
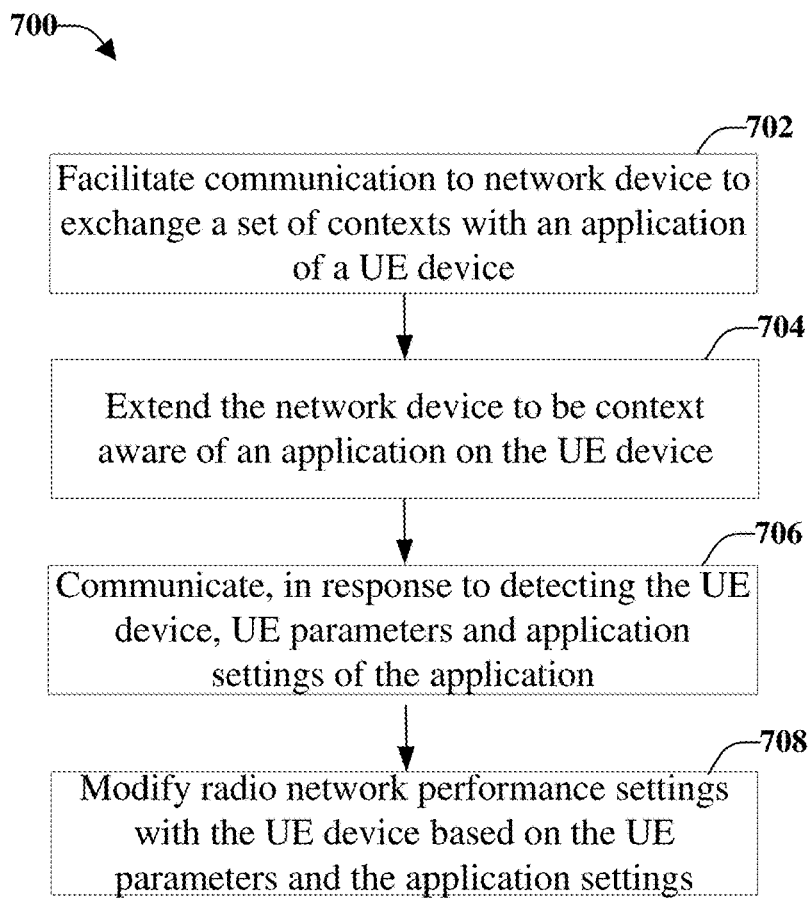
FIG. 7 illustrates an example, non-limiting method, according to an aspect.

FIG. 7 illustrates an example, non-limiting method 700, according to an aspect. At 702, a device (e.g., NOSA manger or kernel) comprising a processor facilitates a communication to a network device and a manger server of a set of self-organizing network devices to exchange a set of contexts between an application managed by a user equipment device and the network device.

At 704, the device extends the set of self-organizing devices to be context aware of the application and the network device.

At 706, in response to detecting the user equipment device communicating via the set of self-organizing network devices, communicating, by the device, to the application and the user equipment device and obtaining, by the device, a set of user equipment device parameters and a set of application settings of the application.

At 708, modifying, by the device, a set of radio network performance settings of the set of self-organizing network devices with the user equipment device based on the set of user equipment device parameters and the set of application settings of the application.

The set of user equipment device parameters can comprise user equipment sensed data related to the user equipment device, such as by one or more sensors on the UE device, for example. The user equipment sensed data comprises accelerometer data, battery power data, speed data, direction data, network observed signaling data representing a signaling of the set of self-organizing network devices, load data representing a load of the set of self-organizing network devices, and congestion data representing a congestion of the set of self-organizing network devices.

The radio network performance settings can include load, congestion, time shifting, prioritization policies, a bandwidth, speed, a network selection, load, and forward functions of the networks that can be provided for the application as resources available, for example. The network performance settings can includes sets of performance parameters as discussed herein available from SON devices within the area or location of the UE device based on the UE parameters ascertained, for example, such as network congestion conditions, and other network parameters associated with one or more different network devices as discussed above.

Figure 8:
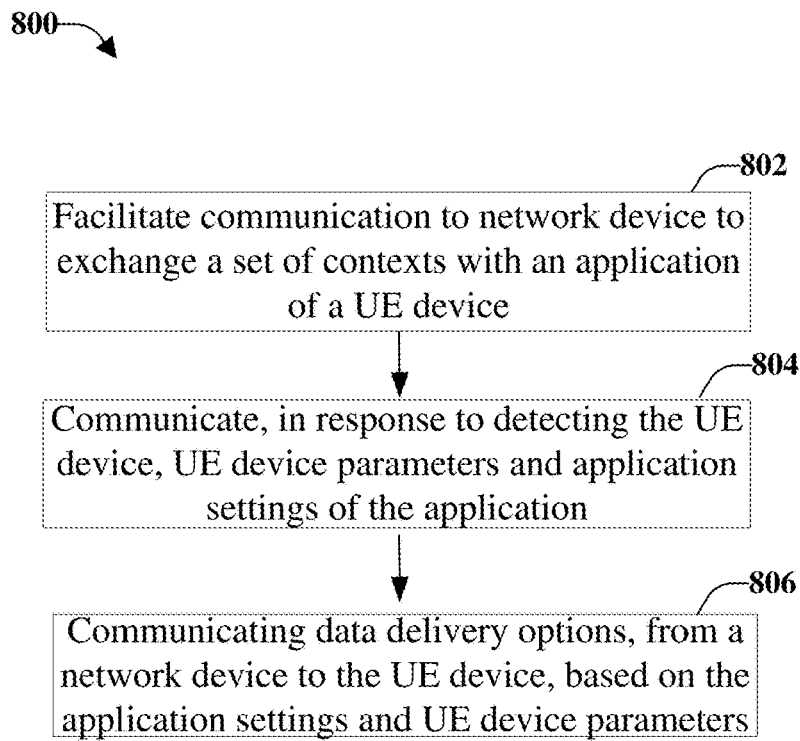
FIG. 8 illustrates another example, non-limiting method, according to an aspect.

FIG. 8 illustrates another example, non-limiting embodiment of a process flow 800. At 802, a device (e.g., NOSA manger or kernel) comprising a processor facilitates a communication to a network device of a set of self-organizing network devices to exchange a set of contexts between an application managed by a user equipment device and the network device.

At 804, in response to detecting the user equipment device communicating via the set of self-organizing network devices, communicating a set of application settings that include a set of data delivery triggers associated with the application and a set of user equipment device parameters associated with the user equipment device.

At 806, in response to detecting the user equipment device communicating via the set of self-organizing network devices, communicating a set of data delivery options from the network device of the set of self-organizing network devices to the user equipment device based on the set of application settings and the set of user equipment device parameters.

In one embodiment, the method can further include selecting a data delivery option of the set of data delivery options based on a data delivery trigger occurring to satisfy a data delivery specified by the set of application settings. The data delivery options, for example, can comprise a different network device option for the different network device of the self-organizing network devices to deliver data, network observed signaling data representing a signaling of the set of self-organizing network devices associated with a network device option of the set of self-organizing network devices, load data representing a load of the set of self-organizing network devices, and congestion data representing a congestion of the set of self-organizing network devices.

Figure 9:
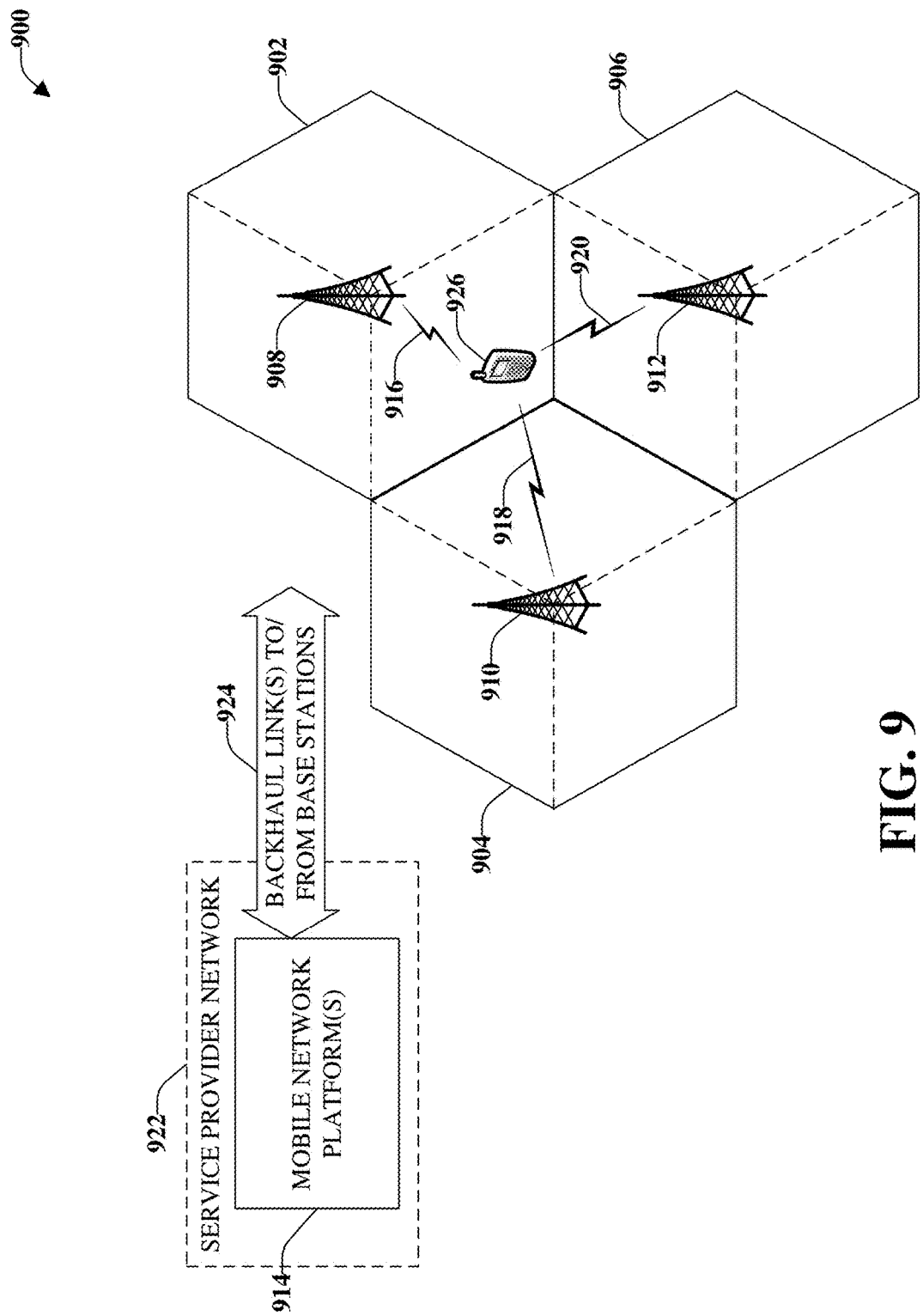
FIG. 9 is a schematic example wireless environment that can operate in accordance with aspects described herein.

By way of further description with respect to one or more non-limiting ways to facilitate network traffic routing selection, FIG. 9 is a schematic example wireless environment 900 that can operate in accordance with aspects described herein. In particular, example wireless environment 900 illustrates a set of wireless network macro cells. Three coverage macro cells 902, 904, and 906 include the illustrative wireless environment; however, it is noted that wireless cellular network deployments can encompass any number of macro cells. Coverage macro cells 902, 904, and 906 are illustrated as hexagons; however, coverage cells can adopt other geometries generally dictated by a deployment configuration or floor plan, geographic areas to be covered, and so on. Each macro cell 902, 904, and 906 is sectorized in a $2\pi/3$ configuration in which each macro cell includes three sectors, demarcated with dashed lines in FIG. 9. It is noted that other sectorizations are possible, and aspects or features of the disclosed subject matter can be exploited regardless of type of sectorization. Macro cells 902, 904, and 906 are served respectively through base stations or eNodeBs 908, 910, and 912. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 914, and set of base stations (e.g., eNode B 908, 910, and 912) that serve a set of macro cells; electronic circuitry or components associated with the base stations in the set of base stations; a set of respective wireless links (e.g., links 916, 918, and 920) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 916, 918, and 920 embody a Uu interface (universal mobile telecommunication system Air Interface).

Mobile network platform(s) 914 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 922 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 914 can control and manage base stations 908, 910, and 912 and radio component(s) associated thereof, in disparate macro cells 902, 904, and 906 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 914 can be embodied in the service provider network 922.

In addition, wireless backhaul link(s) 924 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 924 embodies IuB interface.

It is noted that while exemplary wireless environment 900 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 10:
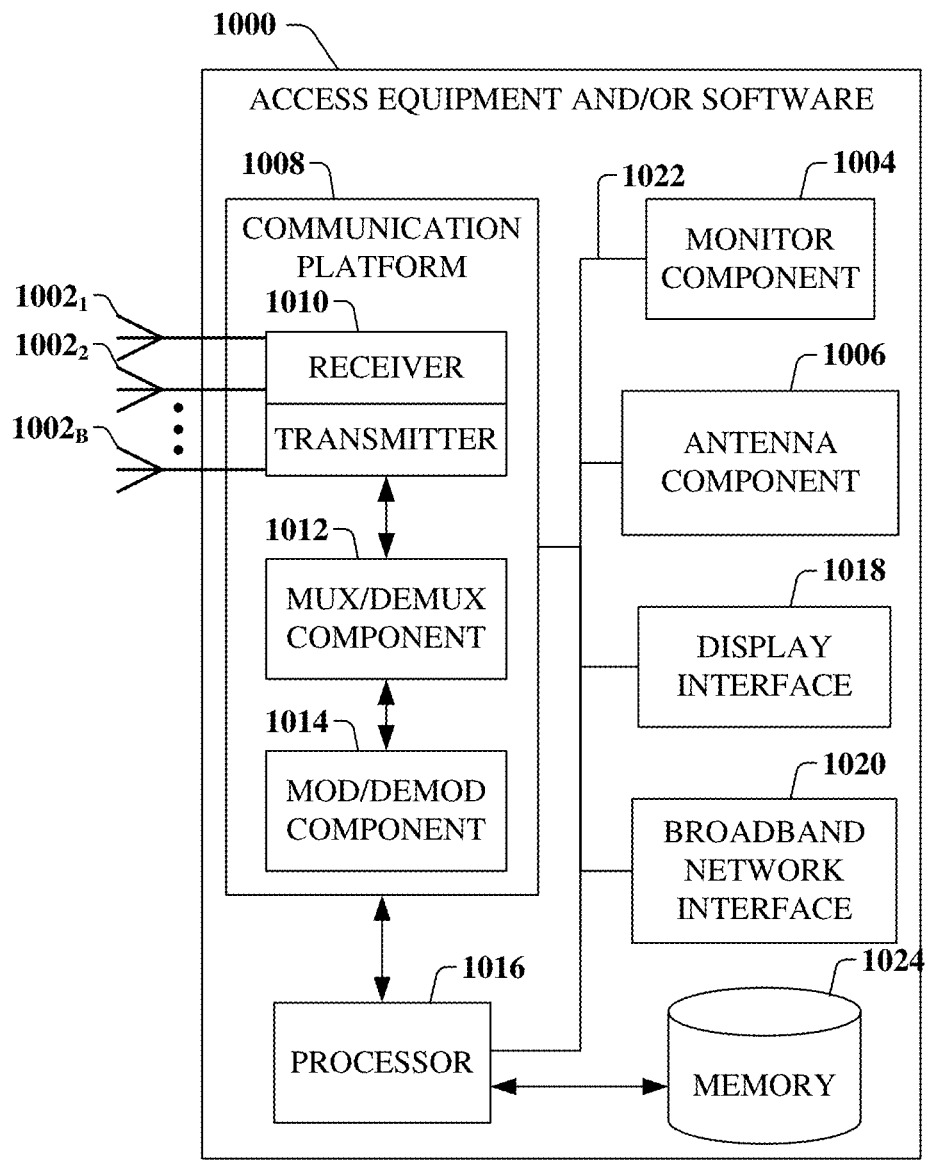
FIG. 10 illustrates a block diagram of access equipment and/or software related to access of a network, in accordance with an embodiment.

To provide further context for various aspects of the disclosed subject matter, FIG. 10 illustrates a block diagram of an embodiment of access equipment and/or software 1000 related to access of a network (e.g., base station, wireless access point, femtocell access point, and so forth) that can enable and/or exploit features or aspects of the disclosed aspects.

Access equipment and/or software 1000 related to access of a network can receive and transmit signal(s) from and to wireless devices, wireless ports, wireless routers, etc. through segments $1002_1$-$1002_B$ (B is a positive integer). Segments $1002_1$-$1002_B$ can be internal and/or external to access equipment and/or software 1000 related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation, with M a positive integer); phase-shift keying; and so forth).

Access equipment and/or software 1000 related to access of a network also includes a processor 1016 configured to confer, at least in part, functionality to substantially any electronic component in access equipment and/or software 1000. In particular, processor 1016 can facilitate configuration of access equipment and/or software 1000 through, for example, monitor component 1004, antenna component 1006, and one or more components therein. Additionally, access equipment and/or software 1000 can include display interface 1018, which can display functions that control functionality of access equipment and/or software 1000, or reveal operation conditions thereof. In addition, display interface 1018 can include a screen to convey information to an end user. In an aspect, display interface 1018 can be a liquid crystal display, a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software 1000 to receive external commands (e.g., restart operation).

Broadband network interface 1020 facilitates connection of access equipment and/or software 1000 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1020 can be internal or external to access equipment and/or software 1000, and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software 1000, memory 1024 can retain location and/or coverage area (e.g., macro sector, identifier(s)) access list(s) that authorize access to wireless coverage through access equipment and/or software 1000, sector intelligence that can include ranking of coverage areas in the wireless environment of access equipment and/or software 1000, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software 1000.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1024, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 11:
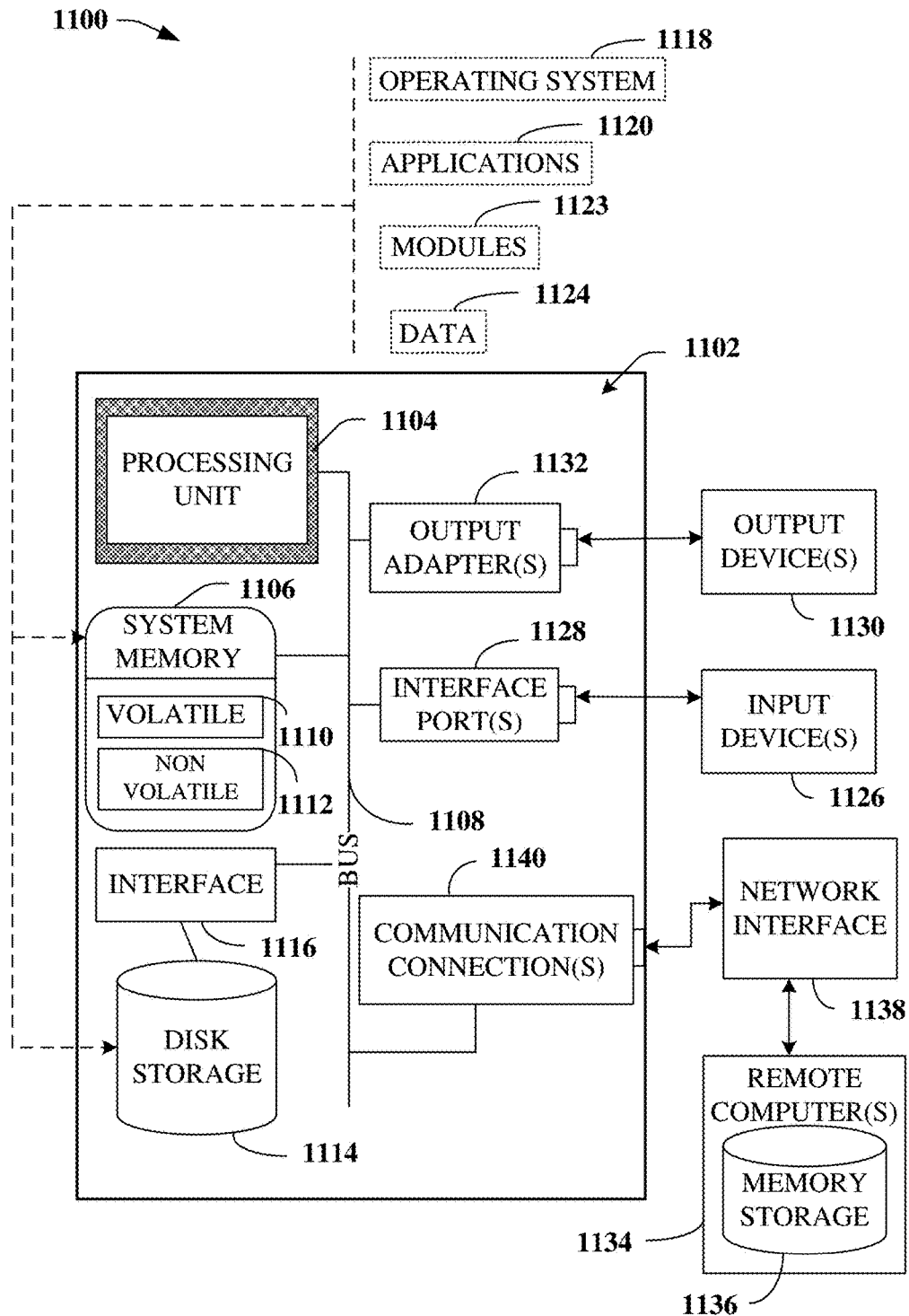
FIG. 11 illustrates a block diagram of a computing system, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that performs particular tasks and/or implement particular abstract data types. For example, in memory there can be software, which can instruct a processor to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1102 includes a processing unit 1104, a system memory 1106, and a system bus 1108. System bus 1108 couples system components including, but not limited to, system memory 1106 to processing unit 1104. Processing unit 1104 can be any of various available processors. Dual microprocessors and other multiprocessor architectures also can be employed as processing unit 1104.

System bus 1108 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire and small computer systems interface.

System memory 1106 includes volatile memory 1110 and nonvolatile memory 1112. A basic input/output system, containing routines to transfer information between elements within computer 1102, such as during start-up, can be stored in nonvolatile memory 1112. By way of illustration, and not limitation, nonvolatile memory 1112 can include read only memory, programmable read only memory, electrically programmable read only memory, electrically erasable programmable read only memory, or flash memory. Volatile memory 1110 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1102 also includes removable/non-removable, volatile/non-volatile computer storage media. In an implementation, provided is a non-transitory or tangible computer-readable medium storing executable instructions that, in response to execution, cause a system comprising a processor to perform operations. The operations can include comparing a first network congestion condition and a first network parameter condition received from a first set of network devices of a first network, and a second network congestion condition and a second network parameter condition received from a second set of network devices of a second network to a usage parameter and a movement parameter of a mobile device. The operations can also include determining a radio technology (e.g., radio network device) to which to route network traffic of the mobile device. Determining the routing of the network traffic can include, based on a first outcome of the comparing, determining to route the network traffic to the first set of network devices associated with a first radio technology. In another example, determining the routing of the network traffic can include, based on a second outcome of the comparing, determining to route the network traffic of the mobile device to the second set of network devices associated with a second radio technology. In an implementation, determining the set of network devices can include complying with a network selection policy received from a network device that provides a service to the mobile device. Further, the operations can include facilitating routing of the network traffic of the mobile device to the set of network devices.

In an implementation, the operations can include analyzing relative movement of the mobile device with respect to the first set of network devices and the second set of network devices. According to another implementation, the operations can include determining speed data representing a substantially current speed of the mobile device and direction data representing a substantially current direction of the mobile device.

FIG. 11 illustrates, for example, disk storage 1114. Disk storage 1114 includes, but is not limited to, devices such as a magnetic disk drive, floppy disk drive, tape drive, external or internal removable storage drives, super disk drive, flash memory card, or memory stick. In addition, disk storage 1114 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1114 to system bus 1108, a removable or non-removable interface is typically used, such as interface component 1116.

It is to be noted that FIG. 11 describes software that acts as an intermediary between users and computer resources described in suitable operating environment. Such software includes an operating system 1118. Operating system 1118, which can be stored on disk storage 1114, acts to control and allocate resources of computer system 1102. System applications 1120 can take advantage of the management of resources by operating system 1118 through program modules 1122 and program data 1124 stored either in system memory 1106 or on disk storage 1114. It is to be understood that the disclosed subject matter can be implemented with various operating systems or combinations of operating systems.

A user can enter commands or information, for example through interface component 1116, into computer system 1102 through input device(s) 1126. Input devices 1126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1104 through system bus 1108 through interface port(s) 1128. Interface port(s) 1128 include, for example, a serial port, a parallel port, a game port, and a universal serial bus. Output device(s) 1130 use some of the same type of ports as input device(s) 1126.

Thus, for example, a universal serial bus port can be used to provide input to computer 1102 and to output information from computer 1102 to an output device 1130. Output adapter 1132 is provided to illustrate that there are some output devices 1130, such as monitors, speakers, and printers, among other output devices 1130, which use special adapters. Output adapters 1132 include, by way of illustration and not limitation, video and sound cards that provide means of connection between output device 1130 and system bus 1108. It is also noted that other devices and/or systems of devices provide both input and output capabilities such as remote computer(s) 1134.

Computer 1102 can operate in a networked environment using logical connections to one or more remote computers, such as remote computer(s) 1134. Remote computer(s) 1134 can be a personal computer, a server, a router, a network computer, a workstation, a microprocessor based appliance, a peer device, or other common network node and the like, and typically includes many or all of the elements described relative to computer 1102.

For purposes of brevity, only one memory storage device 1136 is illustrated with remote computer(s) 1134. Remote computer(s) 1134 is logically connected to computer 1102 through a network interface 1138 and then physically connected through communication connection 1140. Network interface 1138 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1140 refer(s) to hardware/software employed to connect network interface 1138 to system bus 1108. While communication connection 1140 is shown for illustrative clarity inside computer 1102, it can also be external to computer 1102. The hardware/software for connection to network interface 1138 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra-mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
   a processor; and
   a memory that stores executable instructions that, when executed by the processor, facilitate performance of operations, comprising:
      based on application context data associated with an application managed by a mobile device, determining network context data associated with a network device, wherein the application context data is indicative of a process associated with the application, and wherein the network device is a device of self-organizing network devices of a communication network; and
      based on the network context data, directing delivery data from the network device to the mobile device, wherein the delivery data comprises time shift data that is employable to delay a delivery of communication data associated with the application.

2. The system of claim 1, wherein the operations further comprise:
   based on device parameter data associated with the mobile device, modifying a performance setting of the self-organizing network devices.

3. The system of claim 2, wherein the device parameter data comprises sensor data sensed via a sensor of the mobile device.

4. The system of claim 2, wherein the device parameter data comprises battery power data indicative of a power level of a battery of the mobile device.

5. The system of claim 2, wherein the device parameter data comprises speed data indicative of a speed of the mobile device.

6. The system of claim 2, wherein the performance setting comprises a bandwidth associated with the self-organizing network devices.

7. The system of claim 2, wherein the performance setting comprises a network congestion parameter associated with the self-organizing network devices.

8. The system of claim 1, wherein the delivery data comprises network observed signaling data representing a signaling of the self-organizing network devices.

9. The system of claim 1, wherein the delivery data comprises load data representing a load of the self-organizing network devices.

10. A method, comprising:
    based on application context data associated with an application executed via a user equipment, determining, by a system comprising a processor, network context data associated with a network device of self-organizing network devices of a communication network, wherein the application context data is associated with a thread of the application; and
    based on the network context data, initiating, by the system, a transfer of delivery data indicative of a delivery option comprising a time shifting parameter that is employable to delay a transfer of communication data that is to be transmitted from the network device to the user equipment.

11. The method of claim 10, wherein the initiating comprises initiating the transfer based on sensor data sensed via the user equipment.

12. The method of claim 11, wherein the initiating comprises initiating the transfer based on accelerometer data sensed by an accelerometer of the user equipment.

13. The method of claim 11, wherein the initiating comprises initiating the transfer based on power data associated with a battery of the user equipment.

14. The method of claim 11, wherein the initiating comprises initiating the transfer based on network observed signaling data representing a signaling associated with the network device.

15. The method of claim 11, wherein the initiating comprises initiating the transfer of the delivery data comprising profiling data that is employable to facilitate profiling of the communication data.

16. The method of claim 11, wherein the initiating comprises initiating the transfer of the delivery data comprising reprioritization data that is employable to facilitate packet reprioritization of data packets of the communication data.

17. A non-transitory machine-readable medium comprising executable instructions that, when executed by a processor facilitate performance of operations, comprising:
    based on application context data associated with an application of a user equipment, determining network context data associated with a network device of self-organizing network devices of a communication network, wherein the application context data is associated with a thread of the application; and
    based on the network context data, directing, to the user equipment, delivery data comprising time shifting data that enables delaying a delivery of communication data associated with the application.

18. The non-transitory machine-readable medium of claim 17, wherein the operations further comprise:
    based on device parameter data associated with the user equipment, modifying a performance setting of the self-organizing network devices.

19. The non-transitory machine-readable medium of claim 18, wherein the device parameter data comprises sensor data sensed via a sensor of the user equipment.

20. The non-transitory machine-readable medium of claim 18, wherein the device parameter data comprises power data associated with a battery of the user equipment.

* * * * *